United States Patent
Kobayashi

(10) Patent No.: US 11,627,233 B2
(45) Date of Patent: Apr. 11, 2023

(54) IMAGE PROCESSING DEVICE, IMAGE PROCESSING SYSTEM, AND METHOD

(71) Applicant: Ryo Kobayashi, Kanagawa (JP)

(72) Inventor: Ryo Kobayashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/536,096

(22) Filed: Nov. 29, 2021

(65) Prior Publication Data

US 2022/0201153 A1    Jun. 23, 2022

(30) Foreign Application Priority Data

Dec. 23, 2020    (JP) .............................. JP2020-214250

(51) Int. Cl.
  *H04N 1/32*    (2006.01)
  *G06K 15/02*    (2006.01)

(52) U.S. Cl.
  CPC ....... *H04N 1/32309* (2013.01); *G06K 15/181* (2013.01); *G06K 15/1807* (2013.01); *G06K 15/1836* (2013.01); *H04N 2201/327* (2013.01); *H04N 2201/3233* (2013.01)

(58) Field of Classification Search
  CPC .................................................. H04N 1/32309
  USPC .......................................................... 358/3.28
  See application file for complete search history.

(56) References Cited

U.S. PATENT DOCUMENTS

| | | | |
|---|---|---|---|
| 2012/0140251 A1* | 6/2012 | Grodsky | H04N 1/32144 358/1.9 |
| 2013/0250366 A1* | 9/2013 | Kinoshita | G06K 15/1892 358/3.28 |
| 2018/0239282 A1* | 8/2018 | Sakai | H04N 1/00411 |
| 2020/0336603 A1 | 10/2020 | Kobayashi | |
| 2020/0412908 A1 | 12/2020 | Kobayashi | |

FOREIGN PATENT DOCUMENTS

| | | |
|---|---|---|
| JP | 7-319347 | 12/1995 |
| JP | 2006-053725 | 2/2006 |
| JP | 2012-250397 | 12/2012 |

* cited by examiner

*Primary Examiner* — Jacky X Zheng
(74) *Attorney, Agent, or Firm* — Xsensus LLP

(57) ABSTRACT

An image processing device includes an input device and circuitry. The input device inputs data. The circuitry converts text information to be printed included in the data to generate converted information and outputs data for image formation including the converted information.

17 Claims, 21 Drawing Sheets

FIG. 8

R1
```
TARGET AREA 1
   "PAGE NUMBER" :"1" ,
   "COORDINATE_x" :"100" ,
   "COORDINATE_y" :"100" ,
   "WIDTH OF AREA" :"300" ,
   "HEIGHT OF AREA" :"300" ,

TARGET AREA 2
   "PAGE NUMBER" :"1" ,
   "COORDINATE_x" :"200" ,
   "COORDINATE_y" :"200" ,
   "WIDTH OF AREA" :"200" ,
   "HEIGHT OF AREA" :"200" ,

TARGET AREA 3
   "PAGE NUMBER" :"2" ,
   "COORDINATE_x" :"100" ,
   "COORDINATE_y" :"100" ,
   "WIDTH OF AREA" :"300" ,
   "HEIGHT OF AREA" :"300" ,
```

FIG. 9

R1
```
TARGET COLOR 1
   "RGB = (255, 0, 0)"

TARGET COLOR 2
   "RGB = (0, 255, 0)"

TARGET COLOR 3
   "RGB = (0, 0, 255)"
```

IMAGE PROCESSING DEVICE, IMAGE PROCESSING SYSTEM, AND METHOD

CROSS-REFERENCE TO RELATED APPLICATIONS

This patent application is based on and claims priority pursuant to 35 U.S.C. § 119(a) to Japanese Patent Application No. 2020-214250, filed on Dec. 23, 2020, in the Japan Patent Office, the entire disclosure of which is hereby incorporated by reference herein.

BACKGROUND

Technical Field

Embodiments of this disclosure relate to an image processing device, an image processing system, and a method.

Related Art

There is a stealth printing technique for embedding invisible information that is unreadable by human eyes under visible light. For example, from printed matter in which invisible information that can be detected by an infrared light sensing device alone is embedded, the invisible information is read to determine whether the printed matter is falsified.

In the background art, when printing is instructed from a document creator application via a printer driver, invisible information is added at a given position of print data generated by the printer driver.

SUMMARY

In one embodiment of the present disclosure, a novel image processing device includes an input device and circuitry. The input device inputs data. The circuitry converts text information to be printed included in the data to generate converted information and outputs data for image formation including the converted information.

In one embodiment of the present disclosure, a novel image processing system includes an information processing device and an image processing device. The information processing device includes circuitry and an output device. The circuitry receives an extraction condition set on a screen displaying a print preview of data. The output device outputs the data and the extraction condition received. The image processing device gives an image forming instruction in response to a print instruction from the information processing device. The image processing device includes an input device and circuitry. The input device inputs the data and the extraction condition. The circuitry of the image processing device extracts text information included in the data according to the extraction condition and generate converted information of the extracted text information. The circuitry of the image processing device outputs data for image formation including the converted information.

In one embodiment of the present disclosure, a method includes: inputting data, converting text information to be printed included in the data to generate converted information, and outputting data for image formation including the converted information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is a diagram illustrating an example of an extraction condition set in a text extraction rule;

FIG. 9 is a diagram illustrating another example of the extraction condition set in the text extraction rule;

Figure 1:
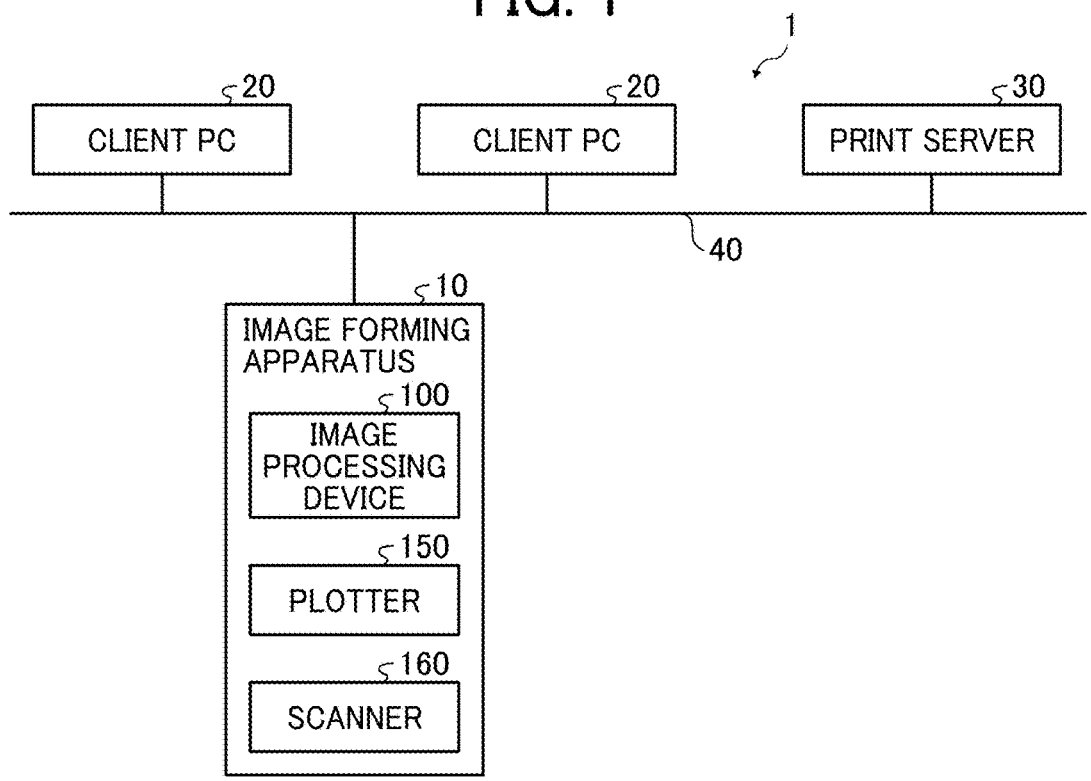
FIG. 1 is a diagram illustrating a network configuration of an image processing system including an image processing device according to a first embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

For the sake of simplicity, like reference numerals are given to identical or corresponding constituent elements such as parts and materials having the same functions, and redundant descriptions thereof are omitted unless otherwise required.

Note that, in the following description, suffixes Y, M, C, and K denote colors of yellow, magenta, cyan, and black, respectively. To simplify the description, these suffixes are omitted unless necessary.

As used herein, the term "connected/coupled" includes both direct connections and connections in which there are one or more intermediate connecting elements.

In the following description, "visible information" refers to information that can be confirmed by human eyes or a sensing device using normal visible light; whereas "invisible information" refers to information that human eyes or the sensing device using normal visible light fail to confirm, for example, information that can be confirmed simply by a sensing device using infrared rays (including near-infrared rays) or ultraviolet rays.

Now, a description is given of a first embodiment.

FIG. 1 is a diagram illustrating a network configuration of an image processing system 1 including an image processing device 100 according to a first embodiment.

In the image processing system 1 of FIG. 1, a client personal computer (PC) 20, a print server 30, and an image forming apparatus 10 are connectable to a communication network 40.

The client PC 20 is an information processing device having a computer configuration. The client PC 20 has functions of, e.g., an operating system (OS) and a document creator application. In response to a print instruction for generated data or data acquired (from outside) of, e.g., a document to be printed, in the client PC 20, the data is passed to a printer driver, which generates and outputs data for printing (i.e., print data) to the image forming apparatus 10 that is designated. Thus, the client PC 20 causes the image forming apparatus 10 to execute printing.

The image forming apparatus 10 is, e.g., a printer or a multifunction peripheral (MFP). As an example, the image forming apparatus 10 includes the image processing device 100, a plotter 150, and a scanner 160. The image processing device 100 has a function of performing various types of processing such as hiding invisible information (i.e., rendering invisible information latent) in the print data transmitted from the client PC 20. The print data processed by the image processing device 100 is output to the plotter 150, which executes printing according to the processed print data.

The following describes a configuration of processing performed by the client PC 20 serving as an information processing device and by the image processing device 100 serving as an image processing device, for example. Alternatively, the print server 30 serving as an information processing device may receive a print instruction from the client PC 20 and instruct the image processing device 100 to execute printing.

Figure 2:
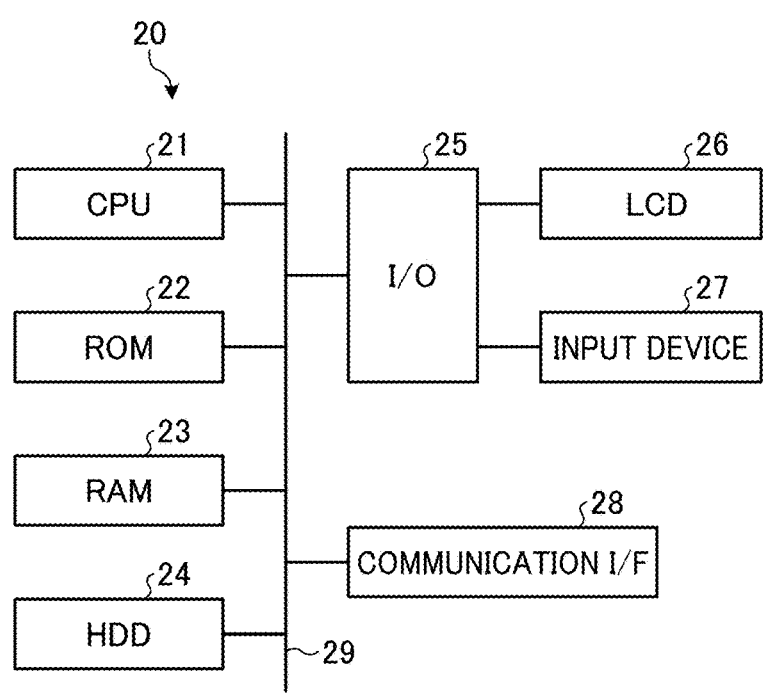
FIG. 2 is a block diagram illustrating a hardware configuration of a client personal computer (PC) included in the image processing system of FIG. 1.

FIG. 2 is a block diagram illustrating a hardware configuration of the client PC 20.

As illustrated in FIG. 2, the client PC 20 includes a central processing unit (CPU) 21, a read only memory (ROM) 22, a random access memory (RAM) 23, a hard disk drive (HDD) 24, an input/output (I/O) 25, a liquid crystal display (LCD) 26, an input device 27, and a communication interface (I/F) 28. These components are connected to each other via a bus 29. Note that the LCD 26 and the input device 27 are connected to the other components via the I/O 25.

The CPU 21 is a central processing unit that controls the entire client PC 20. The ROM 22 is a nonvolatile memory that stores fixed programs such as a Basic Input/Output System (BIOS). The RAM 23 is a volatile memory that is used as a work area for the CPU 21.

The HDD 24 is an auxiliary storage device that stores, e.g., control programs and data. The control programs include various programs of an OS and applications. The storage device is not limited to the HDD 24. Alternatively, a device may be used that includes a storage medium that is used to write or read data magnetically, electrically, or optically.

The LCD 26 is a liquid crystal display that displays an operation screen such as a preview (e.g., print preview) or a setting button. The input device 27 is an input device such as a keyboard or a mouse. Note that a touch panel may be provided as the input device 27.

The communication I/F 28 is a communication interface that communicates with an external device (such as the image forming apparatus 10) via the communication network 40. The communication I/F 28 serves as an input/output device of the client PC 20 serving as an information processing device.

The client PC 20 exerts a function described later when the CPU 21 appropriately loads a program of the OS or an application into the RAM 23 and executes the program.

Figure 3:
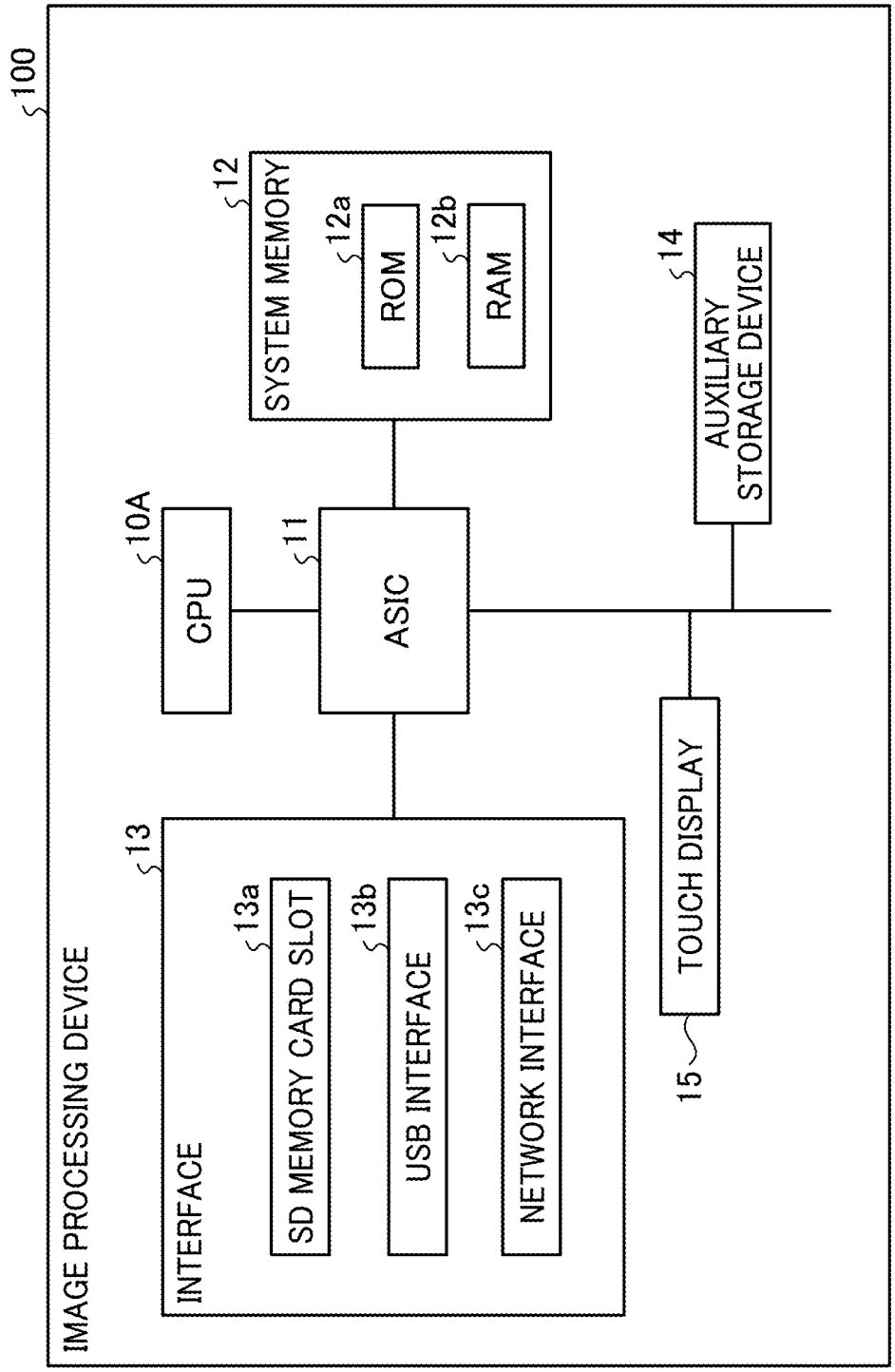
FIG. 3 is a block diagram illustrating a hardware configuration of the image processing device.
Figure 4:
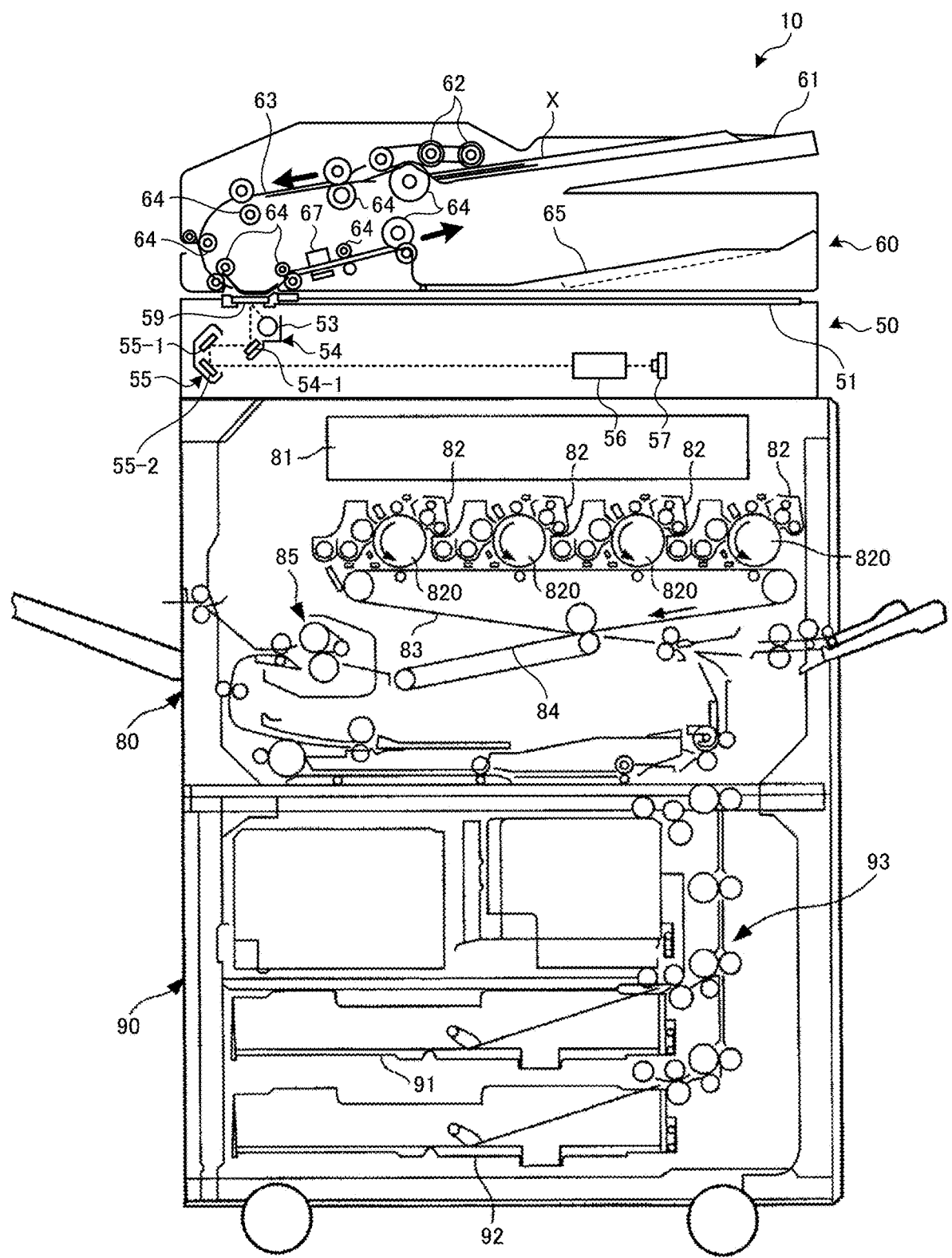
FIG. 4 is a schematic view of an image forming apparatus included in the image processing system of FIG. 1.

Referring now to FIGS. 3 and 4, a description is given of a hardware configuration of the image processing device 100.

FIG. 3 is a block diagram illustrating an example of the hardware configuration of the image processing device 100. FIG. 4 is a schematic view of the image forming apparatus 10 including the image processing device 100.

As illustrated in FIG. 3, the image processing device 100 includes a CPU 10A, an application specific integrated circuit (ASIC) 11, a system memory 12, an interface 13, an auxiliary storage device 14, and a touch display 15. The system memory 12 includes a ROM 12a and a RAM 12b. The interface 13 includes a secure digital (SD) memory card slot 13a, a universal serial bus (USB) interface 13b, and a network interface 13c.

The CPU 10A uses a given area of the RAM 12b as a work area to execute various types of processing in cooperation with the respective programs stored in advance in the ROM 12a or the auxiliary storage device 14 to comprehensively control the operation of the entire image forming apparatus 10. Some or all of the functions described below may be implemented by respective programs or by hardware such as an ASIC.

The ASIC 11 is an integrated circuit (IC) including hardware elements for image processing and therefore dedicated to image processing. The ASIC 11 has a function as a bridge that connects the CPU 10A to the other components illustrated in FIG. 3.

The ROM 12a is a read-only memory that stores fixed programs and fixed data. The RAM 12b is a writable and readable volatile memory that is used to deploy programs or data or store drawing data for printing.

An SD® memory card as an external storage device is removably connected to the SD memory card slot 13a. A USB flash memory as an external storage device is removably connected to the USB interface 13b.

The network interface 13c is, e.g., a network card. The network interface 13c connects the image processing device 100 to the communication network 40 to receive data (e.g., print data) from outside. The network interface 13c serves as an input device of the image processing device 100.

The auxiliary storage device 14 includes a storage medium that is used to write or read data magnetically, electrically, or optically. For example, an HDD is a device including a magnetic recording medium. The auxiliary storage device 14 stores programs related to various types of control of the image forming apparatus 10 such that the programs can be rewritten.

The touch display 15 is a user interface that enables, e.g., a user to perform operations such as print settings in an interactive manner with the image forming apparatus 10. The touch display 15 includes a display device such as a liquid crystal display and an input device including, e.g., a touch panel and a key switch group. Under the control of the CPU 10A, the touch display 15 displays, on a screen of the display device, e.g., states of the image forming apparatus 10 such as operational states or print settings and how to operate the image forming apparatus 10. When the touch display 15 detects an input from, e.g., a user via the touch panel or the key switch group, the touch display 15 outputs the input information to the CPU 10A.

FIG. 4 is a schematic view of the image forming apparatus 10 that is generally called an MFP.

As illustrated in FIG. 4, the image forming apparatus 10 includes an automatic document feeder (ADF) 60 and a reader 50 equivalent to the scanner 160 illustrated in FIG. 1. The image forming apparatus 10 further includes a sheet feeder 90 and an image forming device 80 equivalent to the plotter 150 illustrated in FIG. 1. As illustrated in FIG. 1, the image processing device 100 serving as an image processing device is disposed in, e.g., a control unit inside the image forming apparatus 10.

The reader 50 includes a platen 51 on an upper surface of the reader 50. The reader 50 includes a reading unit that reads an image, as an object of reading, on the platen 51 with inner components such as a light source 53, a first carriage 54, a second carriage 55, a lens unit 56, and a sensor board 57. In FIG. 4, the first carriage 54 includes the light source 53 and a reflection mirror 54-1. The second carriage 55 includes reflection mirrors 55-1 and 55-2.

In the reader 50, the light source 53 emits light to the object of reading. The light reflected from the object is turned by the reflection mirror 54-1 of the first carriage 54 and the reflection mirrors 55-1 and 55-2 of the second carriage 55 and enters the lens unit 56. The light from the lens unit 56 is then formed as an image on a light receiving surface on the sensor board 57. Thus, the reader 50 reads the image of the object. The sensor board 57 includes a line sensor such as a charge-coupled device (CCD) or a complementary metal oxide semiconductor (CMOS). The sensor board 57 sequentially converts the images of the object formed on the light receiving surface of the line sensor into electric signals to read the object as an image. The reading unit includes a general sensing device that reads visible light and an infrared sensing device that reads infrared light to read visible information and invisible information, respectively.

The ADF 60 conveys, with a pickup roller 62, documents X one at a time from a tray 61 to a conveyance passage 63 defined by conveyance rollers 64 so that a surface (or a side) bearing the object of reading of the document X is read at a given read position. The document X is then output onto an output tray 65. The document X is conveyed by rotation of the conveyance rollers 64.

In the image forming apparatus 10, for example, the reader 50 moves and fixes the first carriage 54 and the second carriage 55 to respective home positions. The reader 50 reads the document X passing by a reading window 59 when the first carriage 54 and the second carriage 55 are fixed at the respective home positions. The reading window 59 is a slit-shaped reading window as a part of the platen 51. When the document X passes by the reading window 59 by automatic conveyance, the document X is scanned in a sub-scanning direction. In the image forming apparatus 10, while the document X passes by the reading window 59, the line sensor on the sensor board 57 sequentially reads light emitted to a front side facing the reading window 59 of the document X from the light source 53 and reflected from the front side of the document X.

In case of duplex reading of the document X, a reading module 67 reads a back side of the document X after the document X passes by the reading window 59. The reading module 67 includes an irradiator and a contact image sensor. The reading module 67 reads light emitted to and reflected from the back side of the document X with the contact image sensor. Note that the image forming apparatus 10 of the present embodiment may read the document X in a flatbed system.

In the image forming apparatus 10, the image processing device 100 performs various types of processing according to the print data transmitted from the client PC 20. The image forming device 80 prints a processed image on a recording medium. The image processing device 100 also performs image processing of an image read by the reader 50. The image forming device 80 prints the processed image on a recording medium.

Now, a detailed description is given of the image forming device 80.

The image forming device 80 includes an optical writer 81, tandem image forming units 82 for Y, M, C, and K, an intermediate transfer belt 83, and a secondary transfer belt 84. In the image forming device 80, the optical writer 81 writes a print image on a drum-shaped photoconductor 820 of the image forming unit 82. A toner image is transferred from the photoconductor 820 onto the intermediate transfer belt 83. Thus, toner images of Y, M, C, and K plates are transferred from the respective photoconductors 820 onto the intermediate transfer belt 83. The toner image of K plate is formed with K toner containing carbon black.

In the example illustrated in FIG. 4, the image forming units 82 for Y, M, C, and K include the four rotatable drum-shaped photoconductors 820 for Y, M, C, and K, respectively. Each of the four photoconductors 820 is surrounded by various pieces of image forming equipment such as a charging roller, a developing device, a primary transfer roller, a cleaner unit, and a neutralizer. Such pieces of image forming equipment operate around each of the photoconductors 820 in a series of image forming processes to form an image on the photoconductor 820. The image thus formed on each of the photoconductors 820 is transferred, by the primary transfer roller, as a toner image onto the intermediate transfer belt 83.

The intermediate transfer belt 83 is entrained around a drive roller and a driven roller and disposed so as to pass through primary transfer nips between the four photoconductors 820 and the respective primary transfer rollers. As the intermediate transfer belt 83 rotates, the toner images primarily transferred onto the intermediate transfer belt 83 are conveyed to a secondary transfer device, which secondarily transfers the toner images as a composite toner image onto a recording medium on the secondary transfer belt 84. As the secondary transfer belt 84 rotates, the recording medium is conveyed to a fixing device 85. The fixing device 85 fixes the composite toner image as a color image onto the recording medium. Finally, the recording medium is ejected onto an output tray disposed outside a housing of the image forming device 80.

Note that the recording medium is fed from one of input trays 91 and 92 of the sheet feeder 90, for example. The input trays 91 and 92 store different sizes of recording media. The recording medium thus fed is conveyed through a conveyance unit 93 that includes a plurality of rollers to the secondary transfer belt 84.

The image forming device 80 is not limited to an electrophotographic image forming device that forms an image by electrophotography as described above. Alternatively, the image forming device 80 may be an inkjet image forming device that forms an image in an inkjet system.

Figure 5:
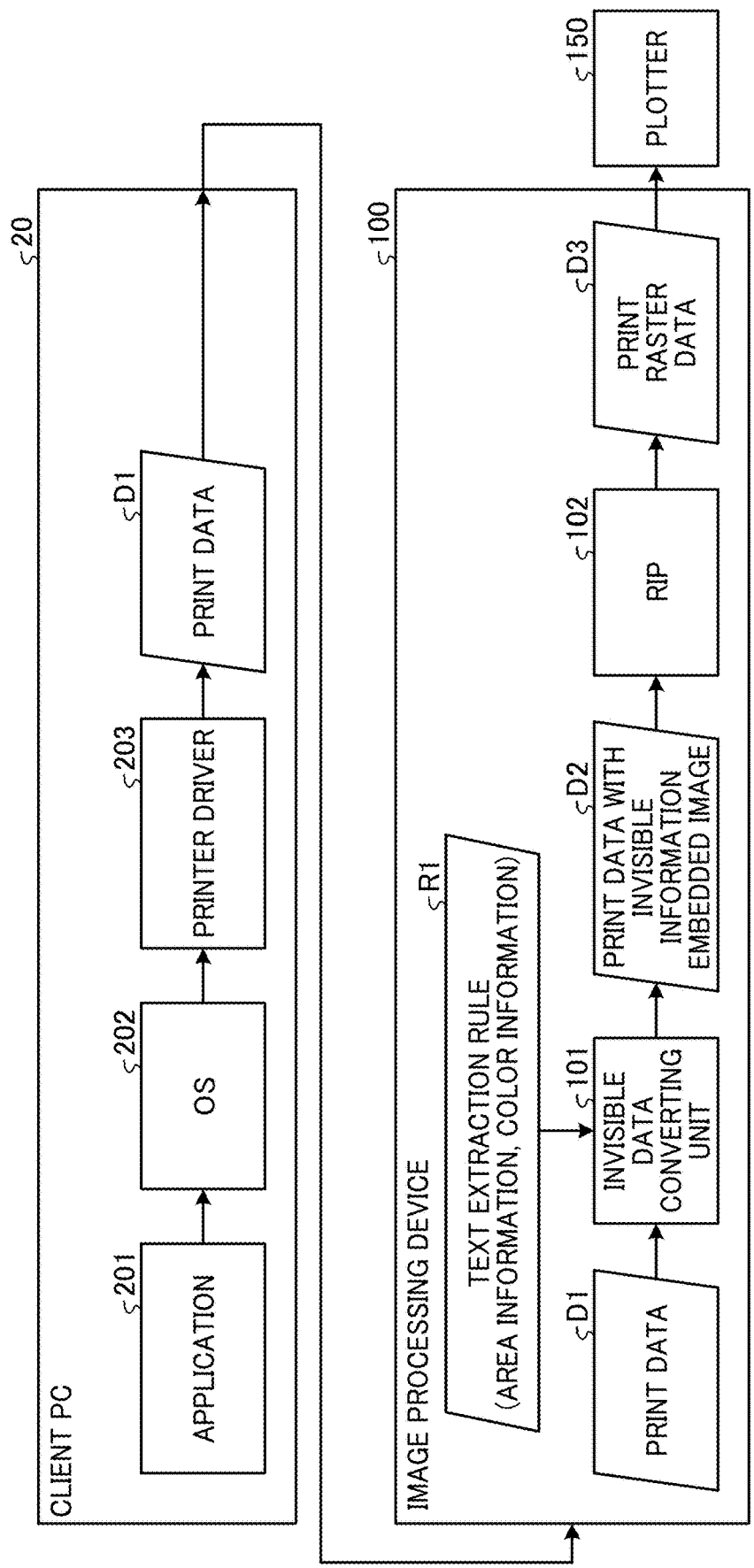
FIG. 5 is a functional block diagram of the client PC and the image processing device.

FIG. 5 is a functional block diagram of the client PC 20 and the image processing device 100 of the image forming apparatus 10.

Now, a description is given of some functional features of the client PC 20 and the image processing device 100.

In response to a print instruction, the client PC 20 converts data generated by an application 201 (such as document data) into print data D1 with a printer driver 203 and outputs the print data D1 to the image processing device 100 as in a flow illustrated in FIG. 5. For example, the application 201 of the client PC 20 generates the print data D1 from the document data via a drawing Application Programming Interface (API) of an OS 202 of the client PC 20 and a printer driver graphics function of the printer driver 203. The print data D1 is generated in a command-data format interpretable by the image processing device 100, generally in a page description language (PDL).

On the other hand, when the print data D1 is input to the image processing device 100, an invisible data converting unit 101 serving as a generating unit extracts text information to be printed from the print data D1 according to an extraction condition set in a text extraction rule R1 and converts the extracted text information into an image including invisible information. In the following description, the image including visible information may be referred to an invisible information embedded image.

After completing the conversion, the invisible data converting unit 101 serving as an output unit arranges the image including the invisible information (i.e., invisible information embedded image) in the print data D1 and outputs, as print data D2, the print data D1 in which the invisible information embedded image is arranged to a raster image processor (RIP) 102. In short, the print data D2 is print data with the invisible information embedded image. Note that the image including the invisible information (i.e., invisible information embedded image) serves as converted information. The print data D1 in which the invisible information embedded image is arranged may be referred to as the print data with invisible information embedded image D2 or simply as the print data D2.

The RIP 102 serving as an output unit converts the print data with invisible information embedded image D2 into raster data and outputs, as print raster data D3, the raster data to the plotter 150. The print raster data 3 is raster data for printing. In other words, the print raster data D3 serves as data for image formation.

Note that the invisible information refers to image information that is difficult to be visually recognized with naked eyes but is detectable in a specific observation environment alone. The following describes, as an example of invisible information, image information that is detectable simply by an infrared sensing device that reacts to infrared light.

Now, a detailed description is given of functions of the invisible data converting unit 101.

Figure 6:
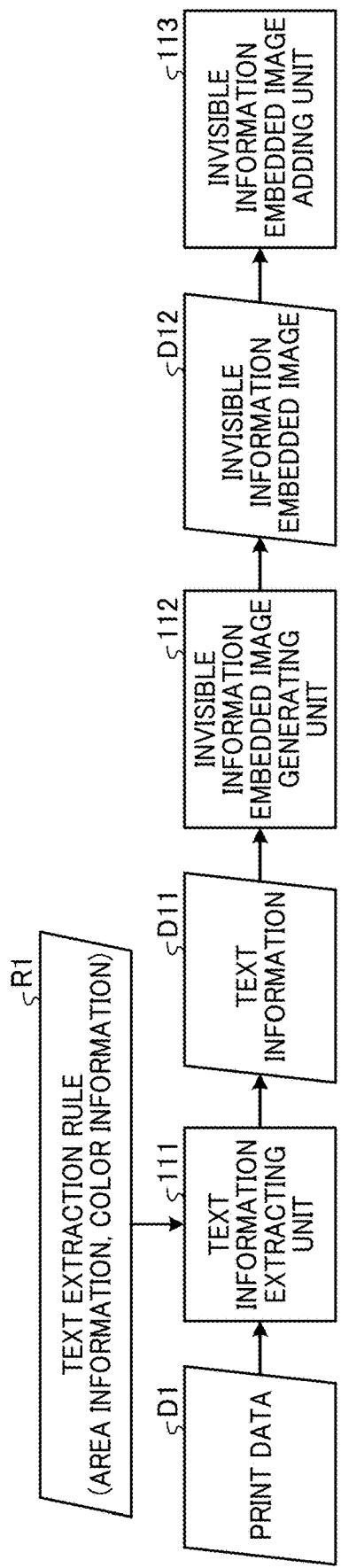
FIG. 6 is a functional block diagram of an invisible data converting unit included in the image processing device.

FIG. 6 is a functional block diagram of the invisible data converting unit 101.

The invisible data converting unit 101 includes a text information extracting unit 111, an invisible information embedded image generating unit 112, and an invisible information embedded image adding unit 113 as illustrated in FIG. 6.

The text information extracting unit 111 analyzes object information in the print data D1 and extracts text object information that satisfies a given extraction condition such as area information or color information set in the text extraction rule R1. For example, in the case of PDL, since the print data D1 includes a drawing object, coordinate data, and color data, the text information extracting unit 111 extracts the text object information corresponding to a coordinate area or color data of text, which is an object of extraction, specified in the text extraction rule R1.

The invisible information embedded image generating unit 112 uses text information D11 such as the text object information extracted by the text information extracting unit 111 to generate an invisible information embedded image D12.

The invisible information embedded image adding unit 113 arranges or adds the invisible information embedded image D12 in the print data D1. Accordingly, for example, the object of extraction extracted by the text information extracting unit 111 from the print data D1 and the invisible information are printed on the same medium.

Figure 7:
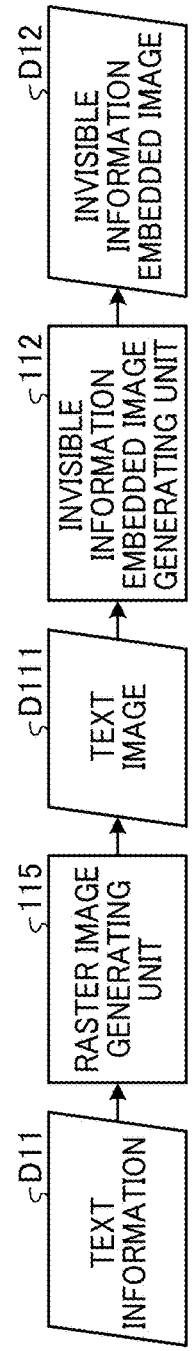
FIG. 7 is a functional block diagram illustrating conversion of text information into raster image.

FIG. 7 is a functional block diagram illustrating conversion of text information into raster image.

In the functional block diagram of FIG. 7, between the processing performed by the text information extracting unit 111 and the processing performed by the invisible information embedded image generating unit 112 illustrated in FIG. 6, a raster image generating unit 115 serving as a raster image data converting unit converts the text information D11 into raster image data.

The raster image generating unit 115 is a functional unit that converts the text information D11 extracted by the text information extracting unit 111 into a red, green, and blue (RGB) raster image, which is an image constructed of coordinate data and pixel values, in a case in which the text information D11 is not a raster image. The invisible information embedded image generating unit 112 receives a text image D111, which is the raster image resulting from the conversion, and generates the invisible information embedded image D12.

FIG. 8 is a diagram illustrating an example of the extraction condition set in the text extraction rule R1.

As an example of the extraction condition, area information is set in the text extraction rule R1. Specifically, FIG. 8 illustrates the area information of three target areas set in the text extraction rule R1. In a case in which the text extraction rule R1 is used, the text information extracting unit 111 extracts, from the print data D1, text in the three areas specified in the text extraction rule R1.

FIG. 9 is a diagram illustrating another example of the extraction condition set in the text extraction rule R1.

As an example of the extraction condition, color information is set in the text extraction rule R1. Specifically, FIG. 9 illustrates the color information of three target colors set in the text extraction rule R1. In a case in which the text extraction rule R1 is used, the text information extracting unit 111 extracts, from the print data D1, text corresponding to each of the three target colors.

Now, a description is given of the image processing device 100 that embeds the invisible information into a document.

In the following, embedding is a way of hiding information.

Figure 10:
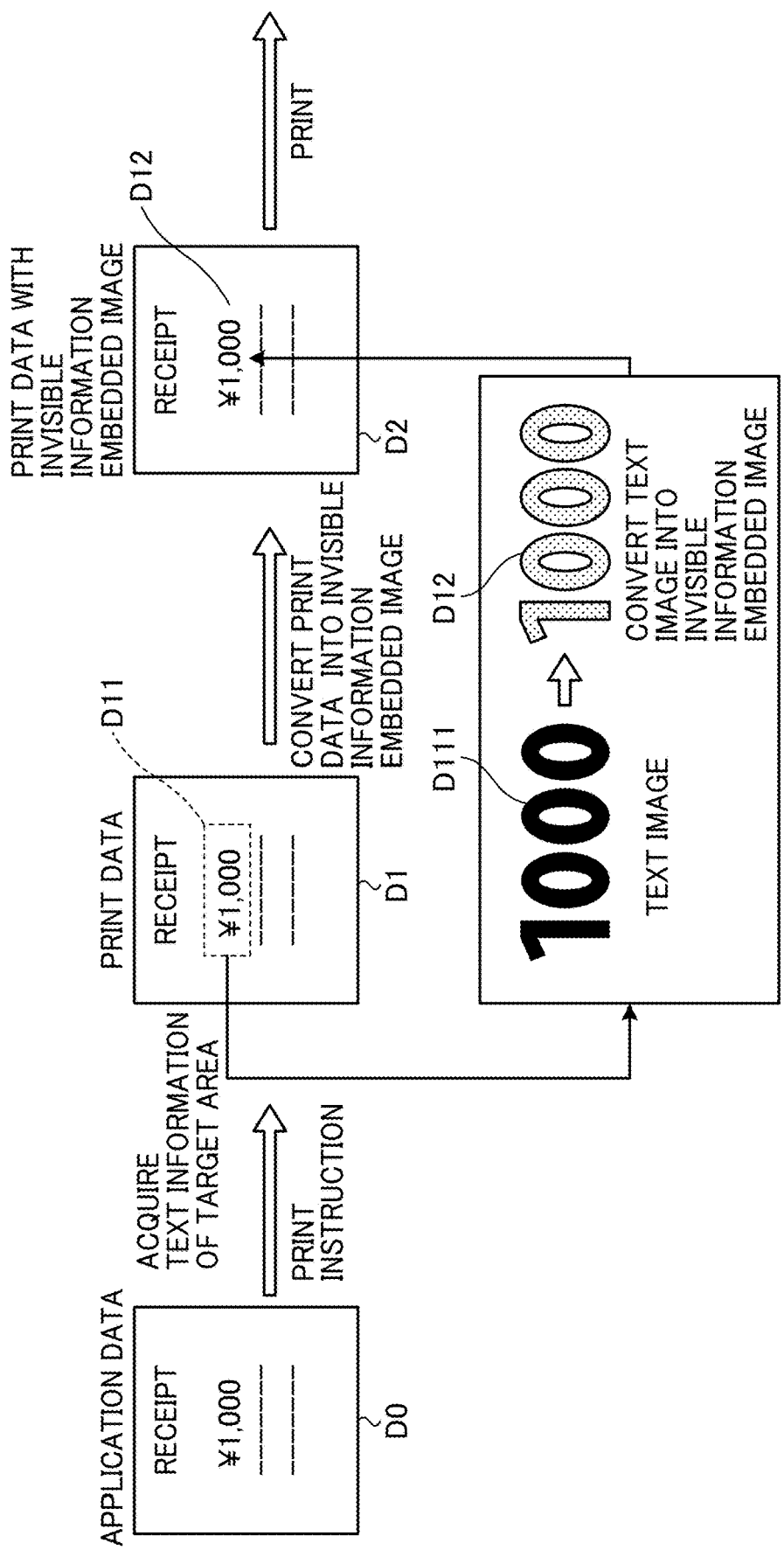
FIG. 10 is a diagram illustrating how to embed invisible information in a document.

FIG. 10 is a diagram illustrating how to embed invisible information in a document.

As illustrated in FIG. 10, in response to a print instruction for document data D0 to be printed, the image processing device 100 embeds invisible information as follows and instructs the plotter 150 to print. Note that the document data D0 is an example of application data generated by an application.

In the example illustrated in FIG. 10, the invisible data converting unit 101 extracts the text information D11 of a target area from the print data D1. In the present example, the invisible data converting unit 101 extracts the text information D11 of an amount of money ¥1,000. The invisible data converting unit 101 converts the text information D11 into the invisible information embedded image D12 in which invisible information is embedded. The invisible information embedded image D12 is an image that looks like the text image D111 by human eyes under visible light. For example, in a case in which the text information D11 is a solid black image (i.e., the text image D111) of ¥1,000, the invisible information is embedded such that the invisible information embedded image D12 looks like the solid black image of ¥1,000.

After converting the text information D11 into the invisible information embedded image D12, the invisible data converting unit 101 deletes the original text information D11 from the print data D1, thus replacing the text information D11 with the invisible information embedded image D12 to generate the print data D2 (i.e., the print data with invisible information embedded image D2). The invisible data converting unit 101 instructs the plotter 150 to print the print data D2.

Now, a description is given of two example ways of converting the text information D11 into the invisible information embedded image D12.

Note that converting the text information D11 into the invisible information embedded image D12 is not limited to the two example ways described below.

Figure 11:
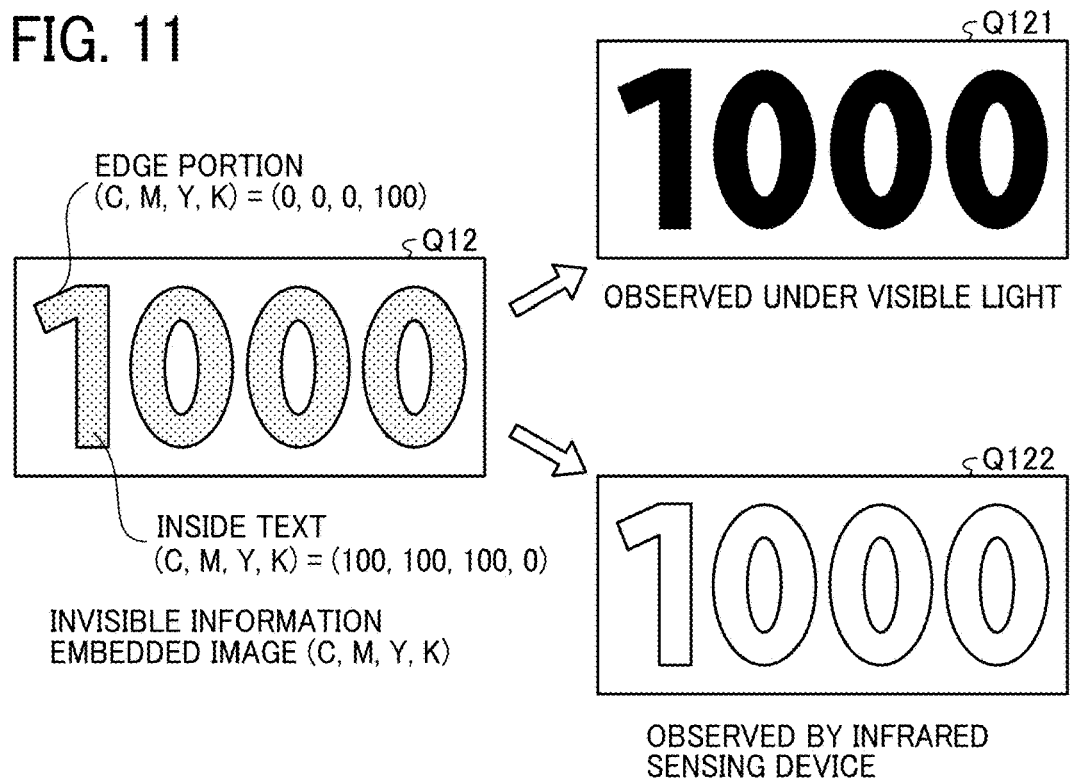
FIG. 11 is a diagram illustrating a first conversion way.
Figure 12:
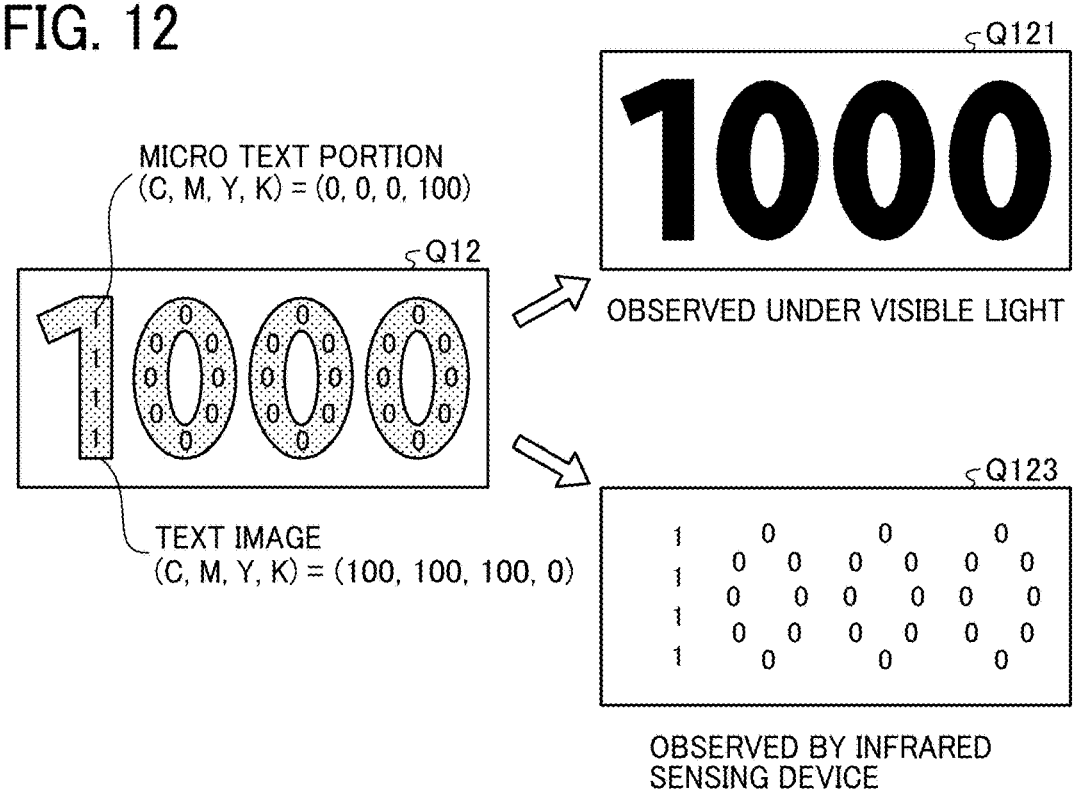
FIG. 12 is a diagram illustrating a second conversion way.

FIG. 11 is a diagram illustrating a first conversion way.
FIG. 12 is a diagram illustrating a second conversion way.
FIG. 11 illustrates an image Q12 of a number "1000" as the invisible information embedded image D12. The text image D111 of "1000" is converted into the image Q12 of "1000."

Specifically, an edge portion (i.e., outline) of the number "1000" of the text image D111 is converted into invisible information; whereas an inside of the edge portion remains as original visible information. Thus, the image Q12 of "1000" is generated. In other words, in the invisible information embedded image D12, the invisible information is hidden in the edge portion of the number of the text image D111.

For example, in a case in which the number "1000" of the text image D111 is printed in solid black with cyan (C), magenta (M), yellow (Y), and black (K) toners, the inside of the edge portion of the number has a mixture ratio (C, M, Y, K)=(100, 100, 100, 0). In other words, the inside of the edge portion of the number is black that is generated by a mixture of C, M, and Y. On the other hand, the edge portion of the number has a mixture ratio (C, M, Y, K)=(0, 0, 0, 100). In other words, the edge portion of the number is black that is generated by K toner alone.

FIG. 11 illustrates an observed image Q121 and an observed image Q122, which are observed images of the image Q12 of "1000" printed. Specifically, the observed image Q121 is an image observed by human eyes under visible light. As illustrated in FIG. 11, since both the edge portion and the inside of the edge portion of "1000" of the observed image Q121 appear in black, the number "1000" appears as if the number "1000" is printed in a typical printing process.

On the other hand, the observed image Q122 is an image observed by an infrared sensing device. The infrared sensing device observes the K toner alone, due to the difference in absorption characteristics between the C, M, and Y toners and the K toner. In other words, in the observed image Q122, the edge portion of the number is embedded as a latent image.

Visually, the number does not appear as a specially processed image. However, the latent image is recognized when the number is observed at a special wavelength in, e.g., an infrared spectrum. For this reason, in a case in which an edge portion of a number is embedded as a latent image, falsification of the number can be detected by observation at a special wavelength. Specifically, for example, if a number is added to a printed matter of the original number, the added number appears differently from the original number when observed at a special wavelength. Thus, falsification is detected.

Like FIG. 11, FIG. 12 illustrates the image Q12 of a number "1000" as the invisible information embedded image D12. In the present example, a part of an entire image area of the number "1000" is converted into invisible information. Specifically, in the present example, an inside of an edge portion of "1000" is partially converted into small numbers (referred to as micro text) as invisible information. In the following description, a portion in which the micro text exists inside the edge portion may be referred to as a micro-text portion. The edge portion and an area inside the edge portion other than the micro-text portion remain unchanged without being subjected to conversion. In the present example, an inside of an edge portion of a number "1" is provided with micro text "1" at given intervals; whereas an inside of an edge portion of a number "0" is provided with micro text "0" at given intervals. The numerical value is obtained from text information before the text image D111 is obtained or by Optical Character Recognition (OCR) processing on the text image.

In the present example, since the entire number of the observed image Q121 including the micro text appears in black as in FIG. 11, the observer sees the number "1000" as if the number "1000" is printed in a typical printing process. In FIG. 12, an observed image Q123 simply illustrates the micro text of K toner observed by the infrared sensing device. In other words, the shape of "1000" and the numerical values of "1000" are expressed by the micro text alone.

Figure 13:
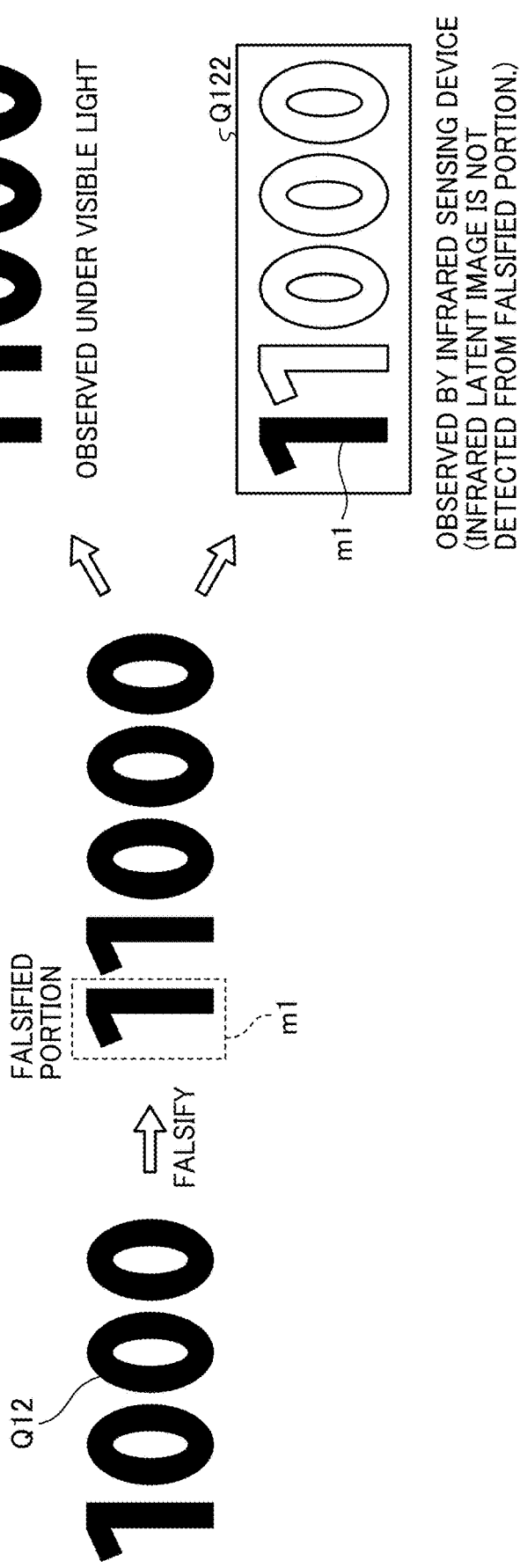
FIG. 13 is a diagram illustrating how to detect falsification.

FIG. 13 is a diagram illustrating how to detect falsification.

Now, a description is given of an example of falsification of a printed matter having the invisible information added by the way described in the present embodiment.

As illustrated in FIG. 13, "1" is added to the number "1000" of the image Q12. FIG. 13 illustrates the added "1" as a falsified portion ml. Since invisible information is not embedded in the falsified portion ml, the observed image Q121 appears as a number "11000" under visible light. On the other hand, in the observed image Q122 that is an image observed by an infrared sensing device, the falsified portion ml is observed as black "1" different from the other numbers observed as outlined numbers. Thus, falsification is detected.

Visually, the number "1000" does not appear as a specially processed image. However, the latent image is recognized when the number "1000" is observed at a special wavelength. In short, a falsified portion is identified.

Figure 14:
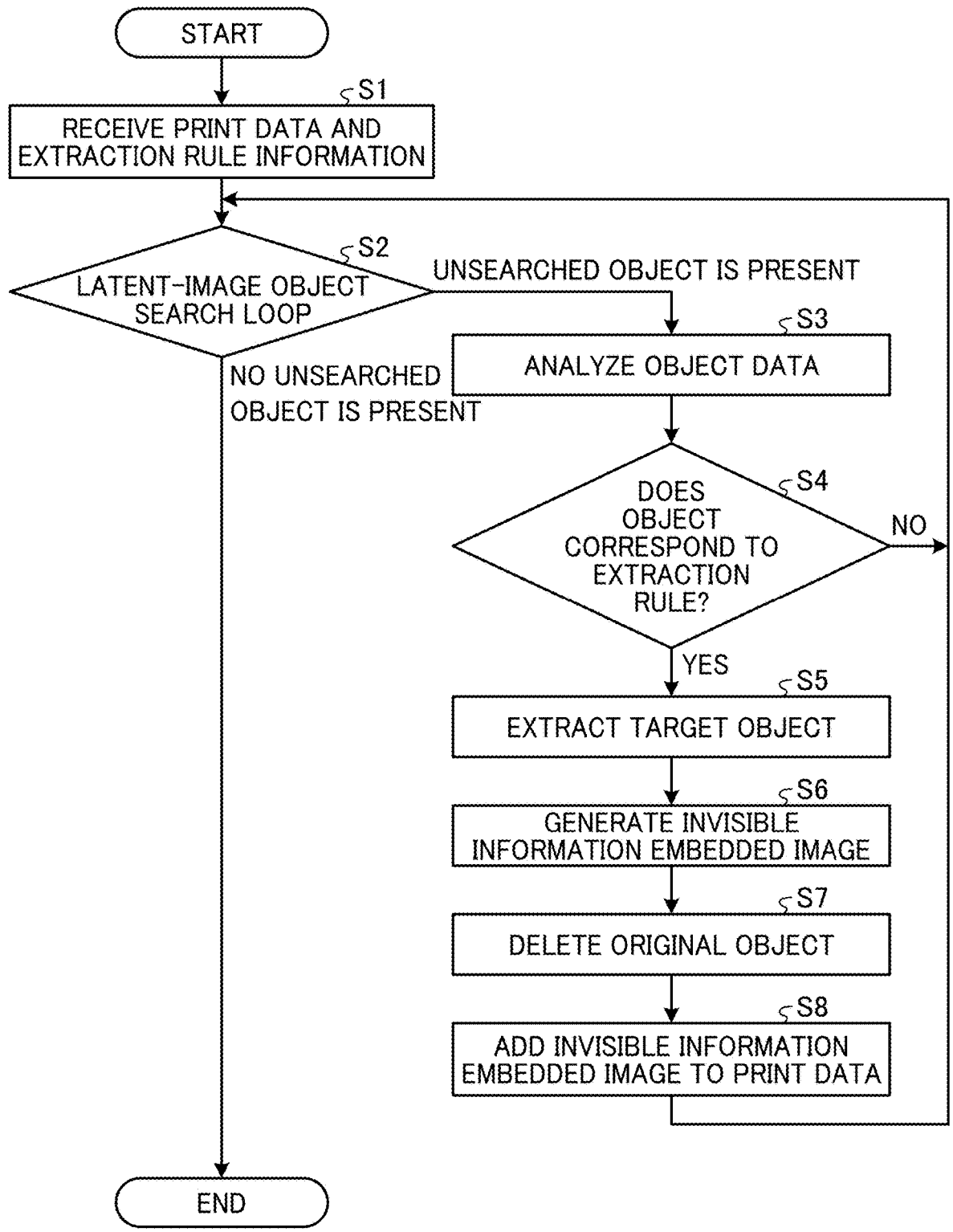
FIG. 14 is a flowchart of a process performed by the invisible data converting unit.
Figure 15:
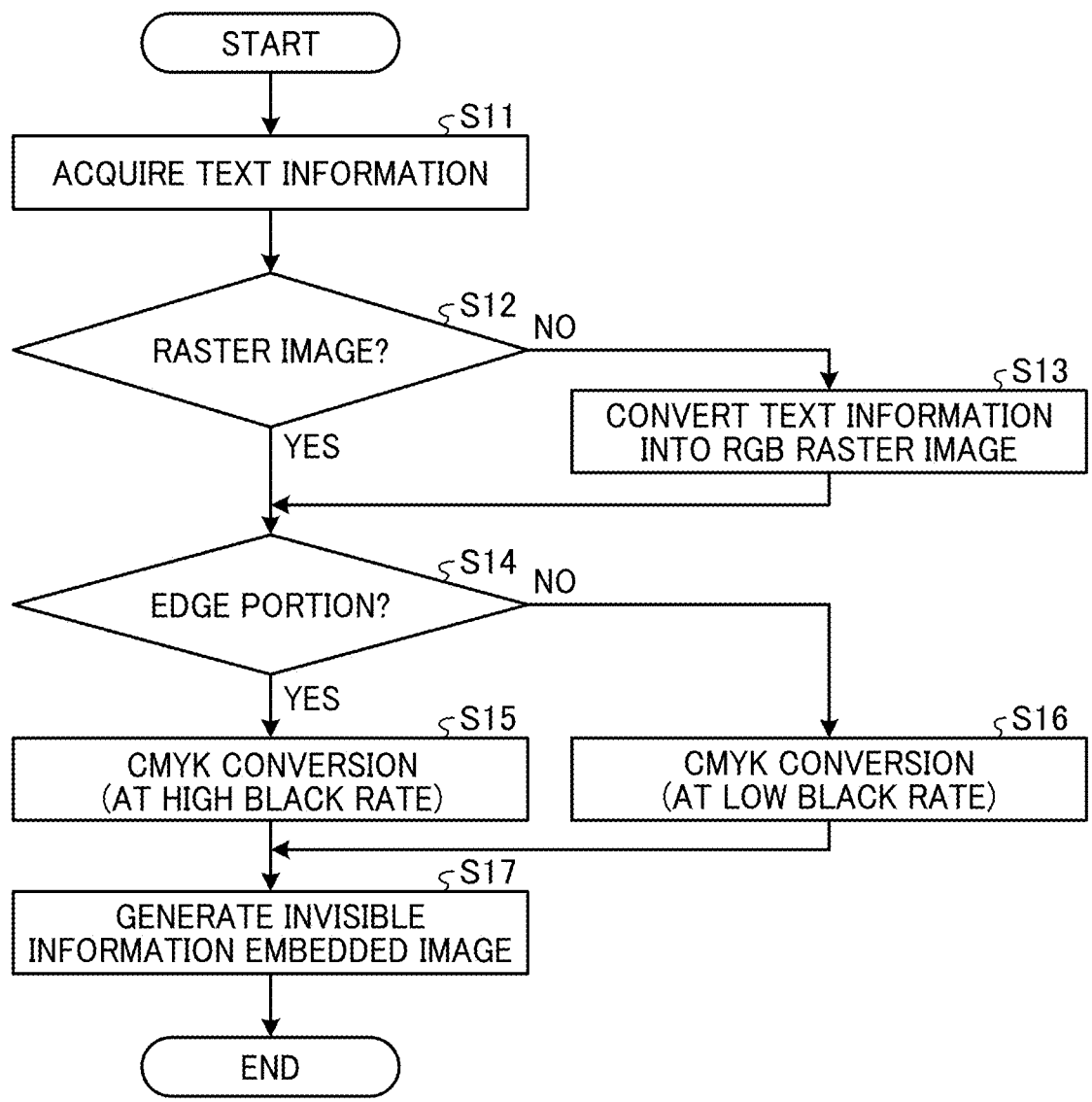
FIG. 15 is a flowchart of a process performed by an invisible information embedded image generating unit included in the invisible data converting unit.

Referring now to FIGS. 14 and 15, a description is given of a process performed by the image processing device 100.

Initially with reference to FIG. 14, a description is now given of an entire process performed by the invisible data converting unit 101 of the image processing device 100, followed by a description of a process performed by the invisible information embedded image generating unit 112, as a part of the entire process performed by the invisible data converting unit 101, with reference to FIG. 15.

FIG. 14 is a flowchart of the process performed by the invisible data converting unit 101.

In step S1, the invisible data converting unit 101 receives the print data D1 and extraction rule information (i.e., extraction condition) of the text extraction rule R1.

In step S2, the invisible data converting unit 101 detects an object in a latent-image object search loop so that invisible information is embedded in the object satisfying the condition.

Specifically, when any unsearched object is present, in step S3, the invisible data converting unit 101 analyzes object data.

In step S4, the invisible data converting unit 101 determines whether the object corresponds to the text extraction rule R1.

Specifically, the invisible data converting unit 101 determines whether the object is a target object corresponding to a target area or color specified in the text extraction rule R1.

When the object is not a target object (NO in step S4), the invisible data converting unit 101 searches for the next object in the latent-image object search loop.

By contrast, when the object is a target object (YES in step S4), in step S5, the invisible data converting unit 101 extracts the target object.

In step S6, the invisible data converting unit 101 generates the invisible information embedded image D12.

Subsequently, in step S7, the invisible data converting unit 101 deletes the original object from the print data D1.

In step S8, the invisible data converting unit 101 adds the invisible information embedded image D12 to the print data D1.

The invisible data converting unit 101 then returns to step S2 to search for the next object in the latent-image object search loop. When no unsearched object is present in step S2, the invisible data converting unit 101 ends the process of embedding the invisible information.

Referring now to FIG. 15, a description is given of the process performed by the invisible information embedded image generating unit 112.

FIG. 15 is a flowchart of the process performed by the invisible information embedded image generating unit 112.

Now, a description is given of an example in which an edge portion of text is converted into invisible information.

First, in step S11, the invisible information embedded image generating unit 112 acquires the text information D11 of the object described above.

Subsequently, in step S12, the invisible information embedded image generating unit 112 determines whether the acquired text information D11 is a raster image.

When the invisible information embedded image generating unit 112 determines that the text information D11 is not a raster image (NO in step S12), in step S13, the invisible information embedded image generating unit 112 converts the text information D11 into an RGB raster image.

The invisible information embedded image generating unit 112 then proceeds to step S14.

By contrast, when the invisible information embedded image generating unit 112 determines that the text information D11 is a raster image (YES in step S12), or after the conversion of the text information D11 into the RGB image in step S13, the invisible information embedded image generating unit 112 performs different types of conversion processing on the raster image (corresponding to the text image D111) between an edge portion of text and a portion other than the edge portion of the text (i.e., an inside the text).

Specifically, in step S14, the invisible information embedded image generating unit 112 determines whether a portion of text in the text image D111 is an edge portion. As an example, when the invisible information embedded image generating unit 112 determines that the portion is an edge portion of the text in the text image D111 (YES in step S14), in step S15, the invisible information embedded image generating unit 112 performs a CMYK conversion at high black rate.

Note that the term "high black rate" refers to a black rate relatively higher than "low black rate" described below. The "black" is K toner. A relatively large amount of K toner is used in the CMYK conversion at high black rate; whereas a relatively small amount of K toner or no K toner is used in a CMYK conversion at low black rate.

When the invisible information embedded image generating unit 112 determines that the portion is not an edge portion of the text in the text image D111 (NO in step S14), in step S16, the invisible information embedded image generating unit 112 performs the CMYK conversion at low black rate.

In step S17, the invisible information embedded image generating unit 112 generates the invisible information embedded image D12 in which the edge portion of the text and the inside of the text are different from each other in distribution of C, M, Y, and K.

As described above, in the first embodiment, when document data generated by an application is printed via a printer driver, important information such as text information that can be falsified is extracted from print data generated by the printer driver according to a given extraction rule and converted into an invisible image, which is added to print data. According to the print data, printing is executed. In other words, a user can convert document data generated by an application into invisible information corresponding to the data without modifying or changing the application. The user can print the document data generated by an application and converted into a document with security from which falsified document information is detectable.

The print data generated by a printer driver generally supports RGB colors and CMYK colors as a color space such as PostScript® and portable document format (PDF). Accordingly, an invisible information embedded image is retainable in print data in CMYK colors. In other words, the present embodiment prevents the invisible information from being damaged by conversion into RGB color data. In short, the invisible information is printed properly. In a case in which a special colorant that transmits visible light but significantly absorbs ultraviolet and infrared light is used, the invisible information embedded image is preferably retained in the print data in a color space including special color information.

An information processing device such as the print server 30 may have some or all of the functions of the client PC 20. An information processing device such as the print server 30 or the client PC 20 may have some or all of the functions of the image processing device 100.

Now, a description is given of a second embodiment.

In the first embodiment, the document data is printed with invisible information hidden in a text portion of the document data. Alternatively, the invisible information may be hidden in another portion such as a background portion of the document data. A description is now given of an example in which invisible information is hidden in background information that is used as a background, according to the second embodiment. The following describes some features of the second embodiment different from the features of the first embodiment, and redundant descriptions of common features of the first and second embodiments are omitted unless otherwise required.

The image processing device 100 according to the second embodiment has some functions different from the functions of the invisible data converting unit 101 of the first embodiment.

Figure 16:
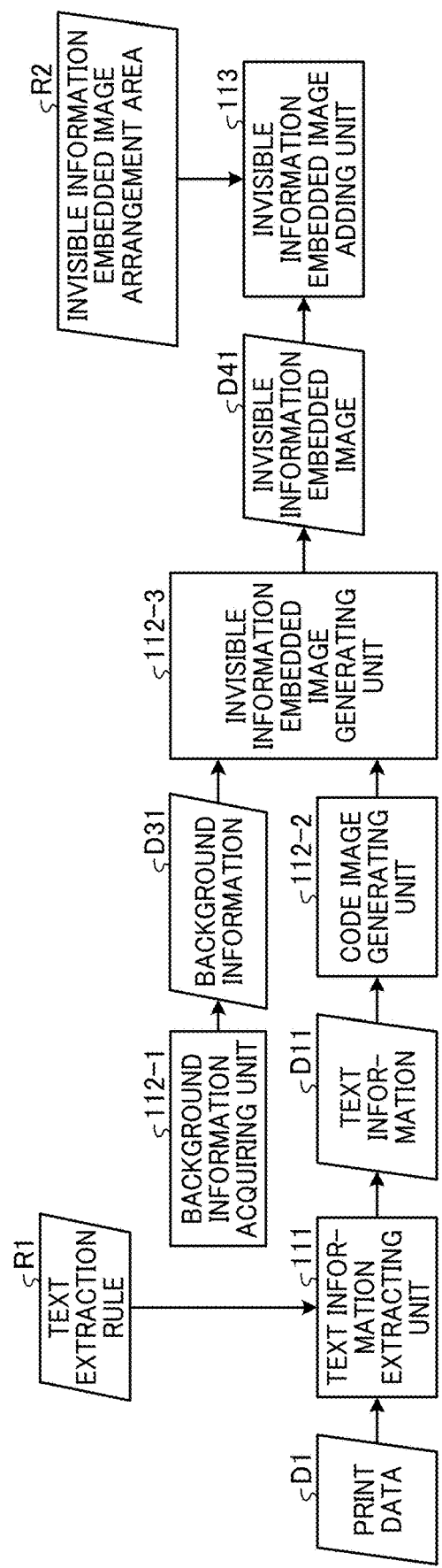
FIG. 16 is a functional block diagram of an invisible data converting unit according to a second embodiment.

FIG. 16 is a functional block diagram of the invisible data converting unit 101 according to the second embodiment.

The text information extracting unit 111 illustrated in FIG. 16 analyzes object information in the print data D1 and extracts text object information that satisfies a given condition such as area information or color information set in the text extraction rule R1. In a case in which the object in the print data D1 is image data and not text data, the OCR processing is performed on the image to convert the image into text data for the subsequent processing.

A code image generating unit 112-2 serving as a code converting unit converts extracted text data of the text information D11 into a code image such as a Quick Response (QR) Code®. The code image thus generated may include all or part of the text of the text information D11.

A background information acquiring unit 112-1 serving as an acquiring unit acquires background information that is used to conceal the code image generated by the code image generating unit 112-2 as invisible information. In the present example, simple background information is used from which an object of extraction is not predicted. Background information prepared in advance may be acquired from an external device via a memory or a network and used. Alternatively, image data extracted from the print data D1 may be used as a background image (i.e., background information). In a case in which the image data is extracted as the background image data from the print data D1, the layout of the original print data D1 is maintained because the background image is simply arranged in the original background image area.

An invisible information embedded image generating unit 112-3 hides invisible information in background information D31 to generate an invisible information embedded image D41. An example way of hiding the invisible information is setting or embedding the invisible information in the background information D31. The invisible information that is used in the second embodiment is a code image generated by the code image generating unit 112-2.

The invisible information embedded image adding unit 113 arranges (or adds) the generated invisible information embedded image D41 at (or to) a designated position in the print data D1. In the present example, an image arrangement area (e.g., coordinate position information) is specified in an invisible information embedded image arrangement area R2. Note that the image arrangement area is an area in which the invisible information embedded image is to be arranged and may be simply referred to as an arrangement area in the following description. The invisible information embedded image adding unit 113 reads the specified image arrangement area and arranges the invisible information embedded image D41 at a position in the print data D1 corresponding to the specified arrangement area.

In the second embodiment, the extracted text object remains unchanged in the print data D1. Accordingly, the text object extracted as an object to be prevented from falsification is printed as is as visible information, together with an invisible code image corresponding to the visible information and hidden in the background image, on the common surface of a recording medium. In this case, in order to detect falsification of the visible information, the invisible information hidden in the background image is decoded and collated with the visible information that is printed together with the invisible information on the common surface of the recording medium.

The invisible information embedded image D41 is added to the print data D1 in a format retaining a combination of colorants having different optical characteristics. For example, in a case in which invisible information that can be detected by an infrared sensing device is embedded in a combination of C, M, and Y toners having high infrared transmittances and a K toner having a high infrared absorptance, the invisible information embedded image D41 is retained in the print data D1 in the form of a CMYK color space. This is because invisible information converted into an RGB color space lacks information on a combination of amounts of colorants, thus being damaged. A PDL corresponding to the CMYK color space, such as PostScript® or PDF®, is used for the print data D1.

Figure 17:
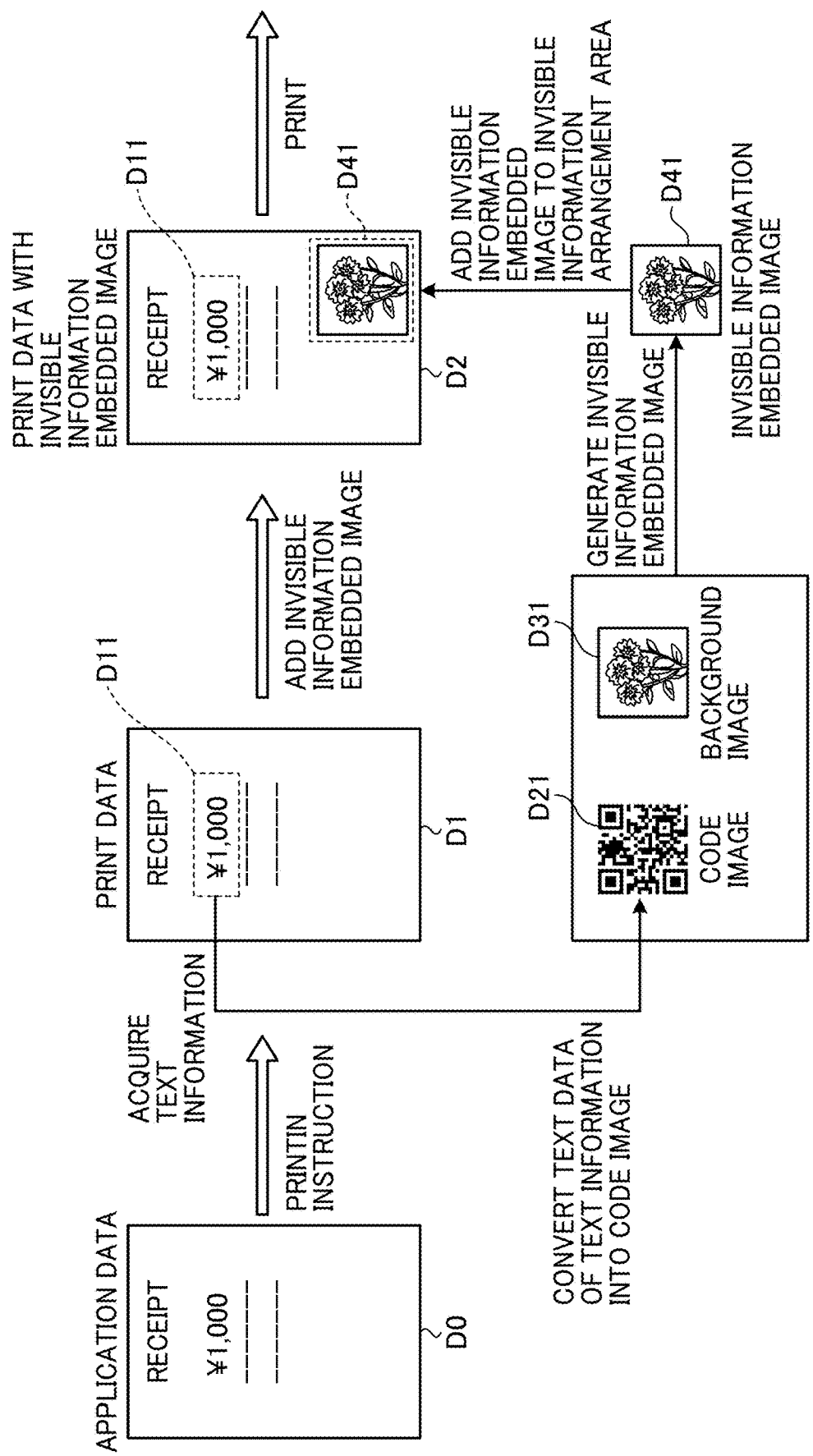
FIG. 17 is a diagram illustrating how to embed invisible information according to the second embodiment.

Referring now to FIG. 17, a description is given of how to embed invisible information according to the second embodiment.

FIG. 17 is a diagram illustrating how to embed invisible information according to the second embodiment.

As illustrated in FIG. 17, in response to a print instruction for the document data D0 generated by an application to be printed, the image processing device 100 embeds invisible information as below and instructs the plotter 150 to print.

In the example illustrated in FIG. 17, the invisible data converting unit 101 extracts the text information D11 of a target area from the print data D1. In the present example, the invisible data converting unit 101 extracts text data of ¥1,000 as money information.

The invisible data converting unit 101 then converts the extracted text data of the text information D11 into a code image D21 such as a QR Code®. The invisible data converting unit 101 then embeds the code image D21 into a background image D31, which is background information.

The background image D31 is any background image, such as a background image prepared in advance or generated from the print data D1. The code image D21 is hidden as invisible information in the background image D31 so as to be detected by an infrared sensing device alone. An example way of hiding the invisible information is embedding the invisible information. A detailed description of the embedding is deferred.

After embedding the code image D21, the invisible data converting unit 101 arranges the embedded image (i.e., the invisible information embedded image D41) at a designated position (i.e., arrangement area) of the print data D1. The invisible data converting unit 101 then outputs the print data (i.e., the print data with invisible information embedded image D2) in which the invisible information embedded image D41 is arranged and gives instructions for the print data D2 to be printed.

As illustrated in FIG. 17, the print data with invisible information embedded image D2 includes the invisible information embedded image D41 and the text information D11 together. Accordingly, the invisible information embedded image D41 and the text information D11 are printed on the common surface of a recording medium together.

Figure 18:
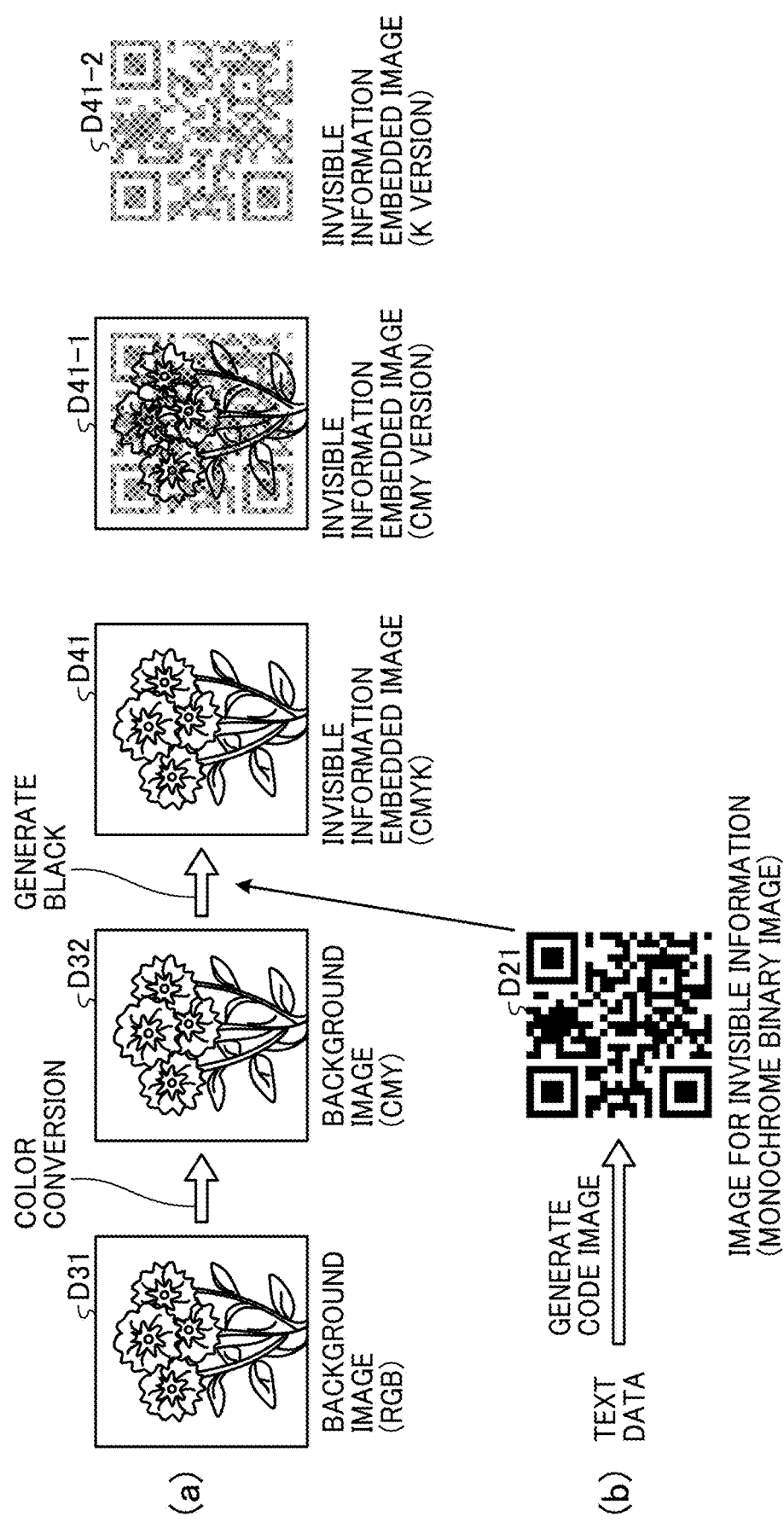
FIG. 18 is a diagram illustrating an example of how the invisible data converting unit generates an invisible information embedded image according to the second embodiment.

Referring now to FIG. 18, a detailed description of embedding the invisible information.

Specifically, a description is now given of how to generate the invisible information embedded image D41.

FIG. 18 is a diagram illustrating an example of how the invisible data converting unit 101 generates the invisible information embedded image D41.

FIG. 18 illustrates a procedure for generating the invisible information embedded image D41, which is generated by embedding the code image D21 in the background image D31.

As illustrated in part (a) and part (b) in FIG. 18, the invisible data converting unit 101 acquires the background image D31 as an RGB background image and text data to be concealed as invisible information (in the present example, text data of the text image D11).

The invisible data converting unit 101 then generates an image for invisible information from the acquired text data. In the present example, the invisible data converting unit 101 generates the code image D21, which is a two-dimensional code image such as a QR Code®, from a text string of the text data. The code image D21 is preferably a monochrome binary image. Alternatively, the code image D21 may be a one-dimensional code image such as a barcode.

The invisible data converting unit 101 converts the RGB background image D31 from RGB to CMY components to generate a CMY background image D32. The invisible data converting unit 101 then performs the CMYK conversion on the CMY background image D32. Specifically, the invisible data converting unit 101 generates black (K) to combine the code image D21 and the CMY background image D32, thus generating the invisible information embedded image D41 as a CMYK image. Instead of generating black for all pixels of the CMY background image D32 with a common black generation table, the invisible data converting unit 101 changes the amount of black to be generated depending on the pixels of the CMY background image D32. For example, in a case in which the code image D21 that is located at the same position as the background image D31 includes a white pixel, the invisible data converting unit 101 does not generate black so that the background image D32 remains at CMY values alone. By contrast, in a case in which the code image D21 that is located at the same position as the background image D32 includes a black pixel, the invisible data converting unit 101 increases the black rate. The invisible data converting unit 101 generates black for each pixel as described above to generate the invisible information embedded image D41 as a CMYK image. Note that the black generation table (or black processing table) is adjusted so that substantially the same color reproduction is performed at low black rate and at high black rate.

Specifically, for example, Japanese Unexamined Patent Application Publication No. H7-319347 incorporated by reference herein discloses a way of combination of printing amounts of colorants for color reproduction may be referred. K toner is added onto C, M, and Y toners as under-color toners to print invisible information, otherwise the C, M, and Y toners are simply used for color reproduction, thus embedding the invisible information. The under-color amount (i.e., the amounts of the C, M, and Y toners) and the printing amount of the K toner are set such that a portion of an image printed with the K toner added onto the C, M, and Y toners as the under-color toners and a portion of the image printed with the C, M, and Y toners alone look substantially the same color.

Accordingly, under visible light, the human eyes fail to observe the invisible information printed with the K toner separately from the information printed with the C, M, and Y toners. However, since the C, M, and Y toners transmit infrared light and the K toner containing carbon black absorbs infrared light, an infrared sensing device does not display the C, M, and Y toners but simply displays the embedded portion of the K toner as invisible information. Since a special toner is not used to print the invisible information, a general-purpose CMYK printer can inexpensively produce a printed matter from which falsification is detectable.

Note that the invisible information may be generated with a special colorant that transmits visible light and exhibits a strong absorptance in an infrared spectrum. Alternatively, invisible information that can be detected in a spectrum other than the infrared spectrum may be generated with a special colorant that transmits visible light and exhibits a strong absorptance in an ultraviolet spectrum.

FIG. 18 illustrates a CMY image D41-1 and a K image D41-2 as a CMY version of invisible information embedded image and a K version of invisible information embedded image, respectively. In the example of FIG. 18, the CMY image D41-1 includes a light green background, pink flowers, and green leaves; whereas the K image D41-2 includes a gray code image.

In a case in which the invisible information embedded image D41 thus generated is added to generate and print the print data D2 as illustrated in FIG. 17, the original background image is simply recognized when observed by naked eyes under visible light because a color difference between the low black rate and the high black rate does not appear under visible light. However, since the black is generated with the amount of black dynamically changed depending on the density of the code image D21, an image equivalent to the original code image D21 is reproduced as the K image D41-2 detected by an infrared sensing device.

As described above, an invisible image is embedded or added into the background image D31 by adjusting a combination of amounts of colorants having different optical characteristics. The background image serves as a mask that conceals the invisible image.

Figure 19A:
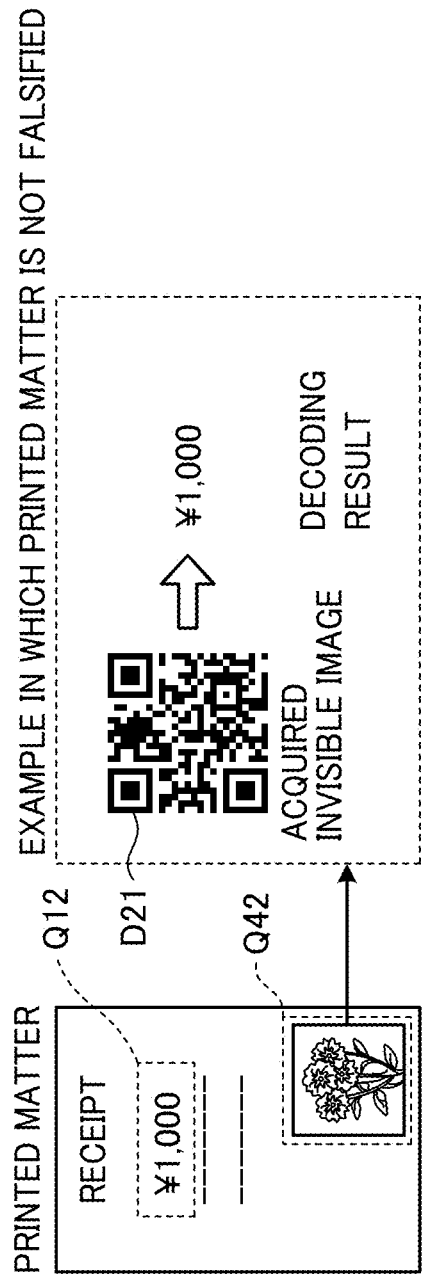
FIG. 19A is a diagram illustrating a print result that is not falsified.
Figure 19B:
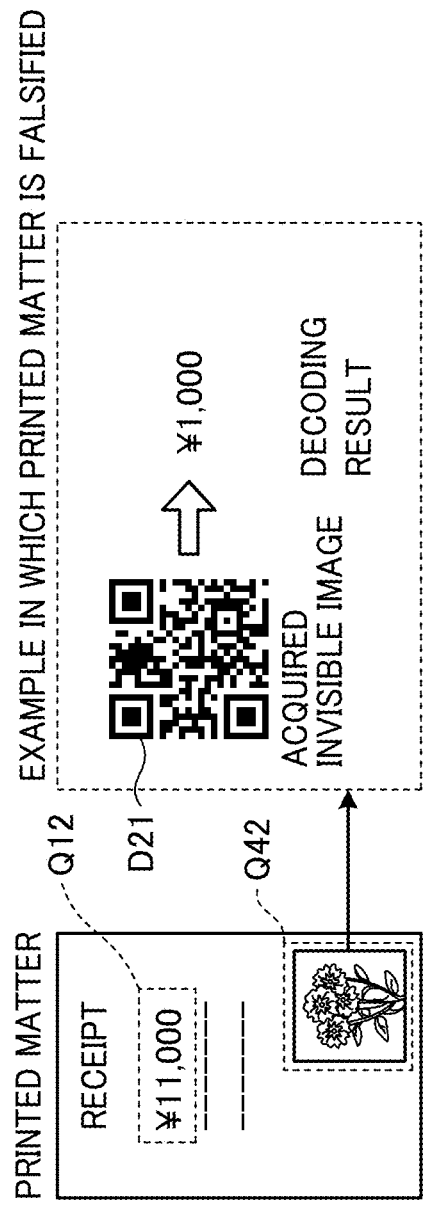
FIG. 19B is a diagram illustrating a print result that is falsified.

FIGS. 19A and 19B illustrate printing results.

Specifically, FIG. 19A illustrates an example in which a printed matter is not falsified. FIG. 19B illustrates an example in which the printed matter is falsified.

As illustrated in FIGS. 19A and 19B, when a background image Q42 of the printed matter is read by an infrared sensing device and the code image D21 output by the infrared sensing device is decoded, the original text data (as money information) before encoded is obtained as a decoding result. In FIG. 19A, since the money information is not falsified, "¥1,000" consistent with the image Q12 (i.e., the money information on the printed matter) is obtained as the decoding result. By contrast, in FIG. 19B, the image Q12 (i.e., the money information on the printed matter) on the printed matter is "¥11,000", which is not consistent with the decoding result "¥1,000." Apparently, the money information is rewritten from "¥1,000" to "¥11,000", thus being falsified.

Figure 20:
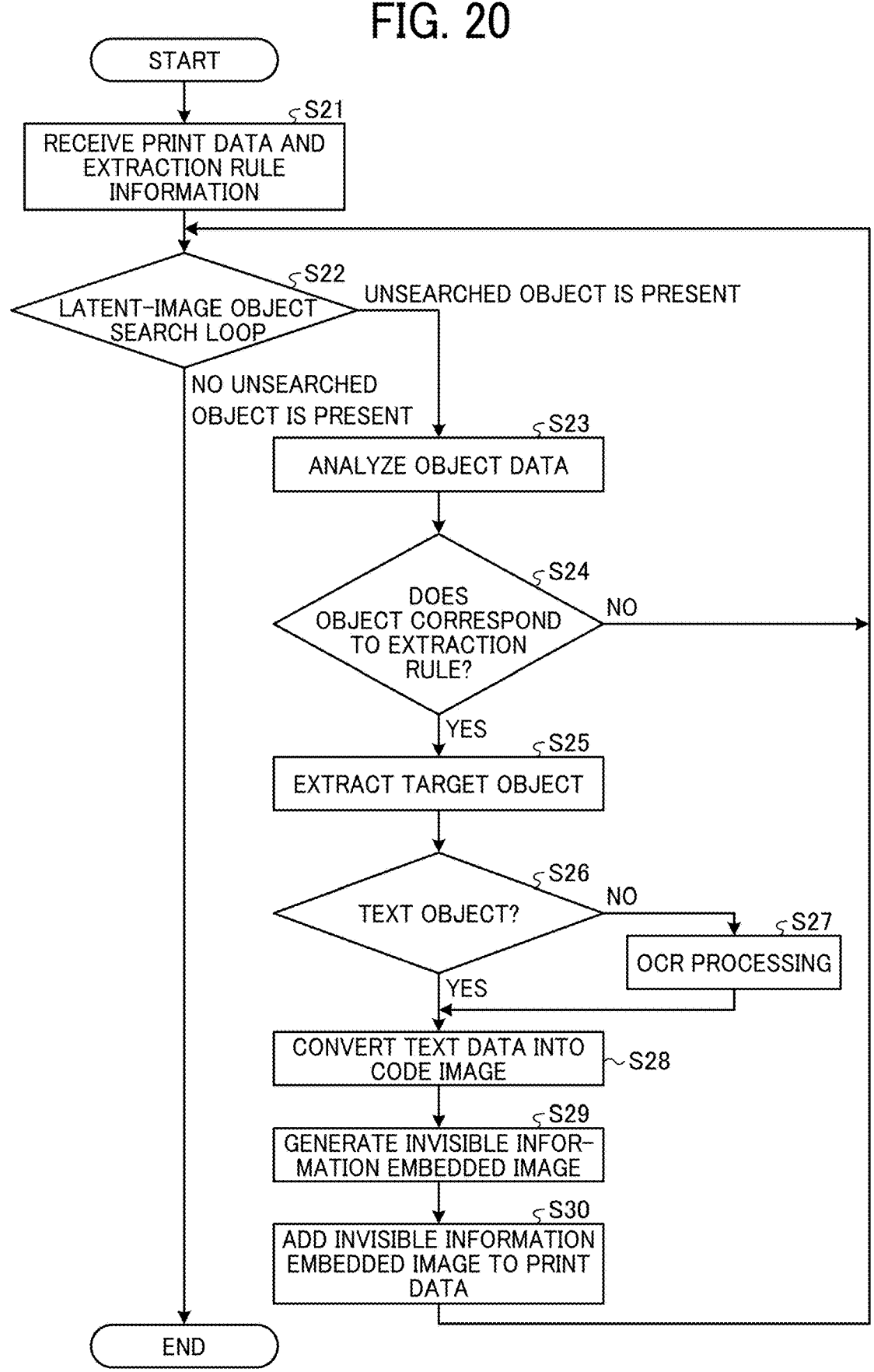
FIG. 20 is a flowchart of a process performed by the invisible data converting unit according to the second embodiment.

Referring now to FIG. 20, a description is given of a flow of a process performed by the invisible data converting unit 101 of the image processing device 100.

The following describes some features of the flow in the second embodiment different from the features of the flow described above in the first embodiment, and redundant descriptions of common features of the flow in the first and second embodiments are omitted unless otherwise required.

FIG. 20 is a flowchart of the process performed by the invisible data converting unit 101 according the second embodiment.

In FIG. 20, since steps S21 to S25 correspond to steps S1 to S5 of FIG. 14, a description is now given of the flow from step S26.

After extracting the target object in step S25, in step S26, the invisible data converting unit 101 determines whether the extracted object is a text object.

When the extracted object is not a text object (NO in step S26), in step S27, the invisible data converting unit 101 performs the OCR processing to extract text data from the object.

Then, the invisible data converting unit 101 proceeds to step S28.

By contrast, when the extracted object is a text object (YES in step S26) or after the OCR processing in step S27, in step S28, the invisible data converting unit 101 converts the text data into the code image D21.

Subsequently, in step S29, the invisible data converting unit 101 embeds the code image D21 in the background image D32 to generate the invisible information embedded image D41.

In step S30, the invisible data converting unit 101 adds the invisible information embedded image D41 to the print data D1.

Thereafter, the invisible data converting unit 101 returns to step S22 to search for the next object in the latent-image object search loop. When no unsearched object is present in step S22, the invisible data converting unit 101 ends the process of embedding the invisible information.

As described above, hiding the invisible information in the background image enables an image such as a two-dimensional barcode to be used as invisible information. In the second embodiment, infrared invisible information is generated by a combination of printing amounts of cyan, magenta, yellow, and black colorants having different optical characteristics. The black colorant is a black toner that absorbs both infrared light and visible light, as represented by carbon black. Since black is non-transparent under visible light, the black toner is visually recognized under visible light naturally, when the black toner is superimposed on or under another toner that is non-transparent under visible light and printed. In order to make an area printed in black invisible information, the above-described special combining process is performed.

In the second embodiment, text information in print data is converted into an invisible code image to detect falsification of important information in document data.

Now, a description is given of a third embodiment.

A description has been given of the embodiments in which the image processing device 100 extracts, from the print data D1, the text information D11 of which invisible information is to be embedded, according to the extraction condition of the text extraction rule R1. Alternatively, e.g., a user may set an object of extraction at the time of printing. The following describes some features of the third embodiment different from the features of the first and second embodiments, and redundant descriptions of common features of the first to third embodiments are omitted unless otherwise required.

Figure 21:
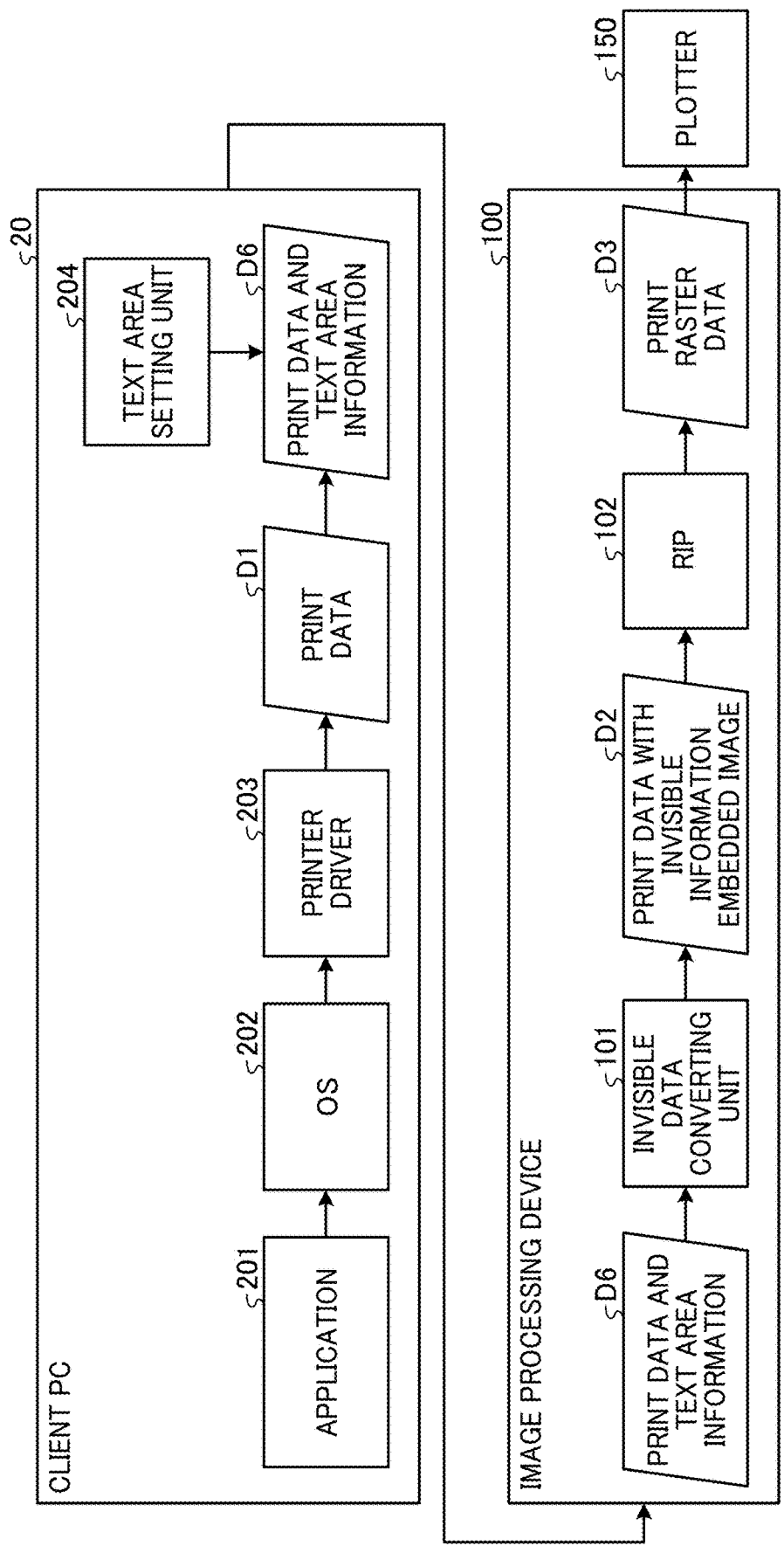
FIG. 21 is a functional block diagram of a client PC and an image processing device according to a third embodiment.

FIG. 21 is a functional block diagram of the client PC 20 and the image processing device 100 according to the third embodiment.

In the configuration of FIG. 21, the client PC 20 includes a text area setting unit 204 serving as a setting unit, instead of the text extraction rule R1 of the image processing device 100 described above with reference to the functional block diagram of FIG. 5.

In FIG. 21, in the client PC 20, the text area setting unit 204 interprets the print data D1 generated by the printer driver 203 and draws a print image as a print preview screen on the display (i.e., the LCD 26 illustrated in FIG. 2) of the client PC 20. The text area setting unit 204 receives a text area input by, e.g., a user with the input device 27 (illustrated in FIG. 2) on the print preview screen and transmits text area information indicating the received text area to the image processing device 100 together with the print data D1.

The text area setting unit 204 receives a designation of one or more text areas in the print data D1. For example, in a case in which the user wants to confirm whether a portion (e.g., text information such as money information) of an image is falsified, the user designates a range of text area by key operation, mouse operation, or touch operation on the print preview screen. In a case in which the user wants to confirm whether a plurality of portions of an image is falsified, the user designates the range for each text area. In response to the designation of the text area, the text area setting unit 204 writes the designated text area in the text area information.

On the other hand, in the image processing device 100, in response to print information D6 including the print data D1 and the text area information, the invisible data converting unit 101 extracts text information of the designated area from the print data D1 according to the text area information included in the print information D6 and converts the extracted text information into an image including invisible information. Since the processing after the conversion is substantially the same as the processing described above, a redundant description thereof is omitted.

Figure 22:
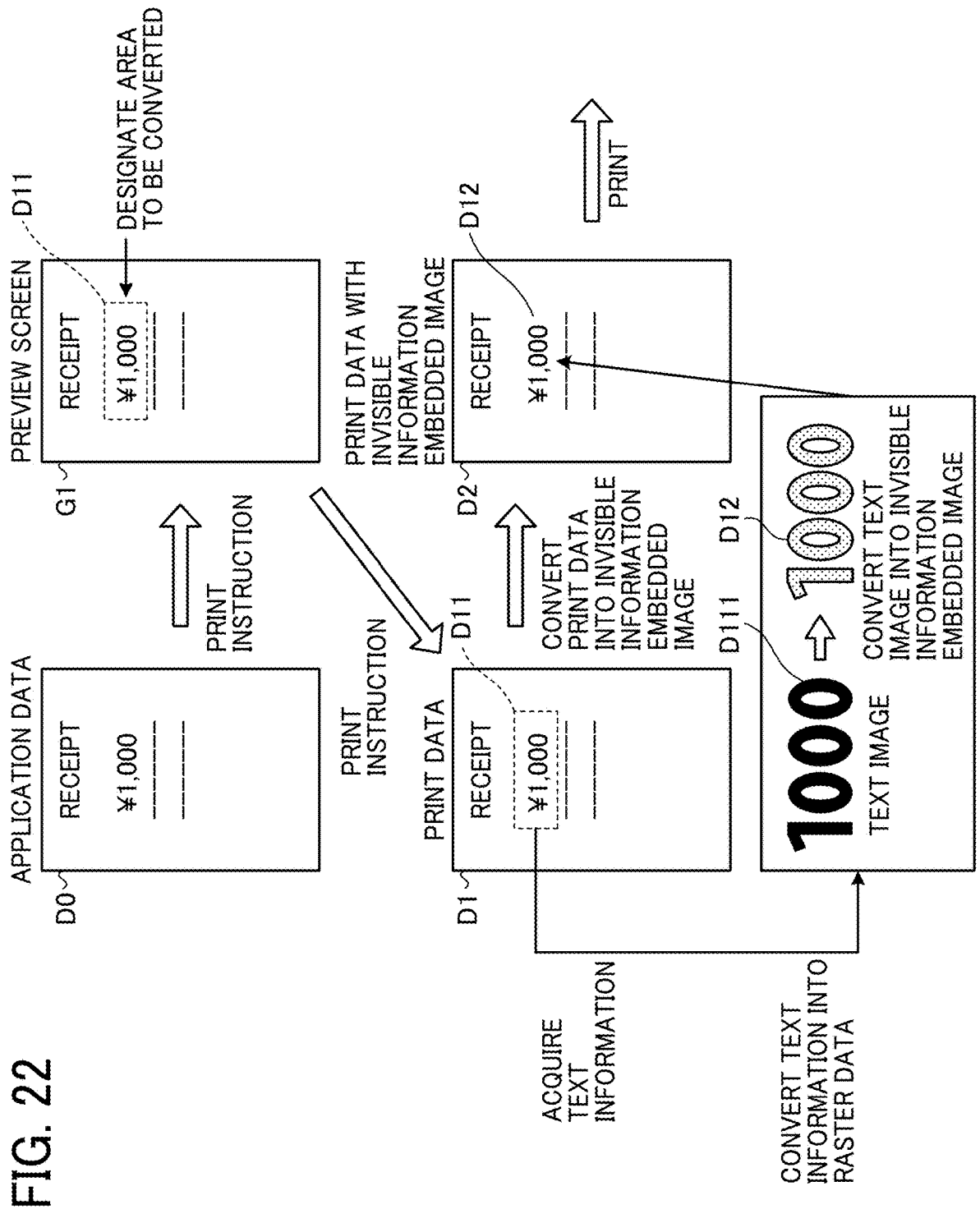
FIG. 22 is a diagram illustrating how to embed invisible information in a document according to the third embodiment.

FIG. 22 is a diagram illustrating how to embed invisible information in a document according to the third embodiment.

As illustrated in FIG. 22, in response to a print instruction for the document data D0 generated by an application to be printed, the image processing device 100 embeds invisible information as below and instructs the plotter 150 to print.

In the example illustrated in FIG. 22, the text area setting unit 204 receives setting or designation of a text area through a preview screen G1. In the present example, when a user designates a range of the text information D11 of an amount of money ¥1,000, the text area setting unit 204 includes the area (e.g., coordinate information) in the text area information.

The invisible data converting unit 101 converts text information (in the present example, the text information D11) of the text area specified in the text area information into raster data. The invisible data converting unit 101 then converts the text image D111 of the raster data into the invisible information embedded image D12 in which invisible information is embedded. The invisible information embedded image D12 is a text image in which invisible information is embedded. In other words, the invisible information embedded image D12 is generated in the manner illustrated in FIG. 10.

After converting the text image D111 into the invisible information embedded image D12, the invisible data converting unit 101 deletes the original text information D11 from the print data D1, thus replacing the text information D11 with the invisible information embedded image D12 to generate the print data D2. The invisible data converting unit 101 gives instructions for the print data D2 to be printed.

As described above, in the third embodiment, a user designates the text area. Alternatively, text information to be converted into invisible information may be extracted according to color information designated by a user.

Now, a description is given of a fourth embodiment.

In a case in which a user sets an object of extraction at the time of printing in the second embodiment, the user may set the object as below, for example. The following describes some features of the fourth embodiment different from the features of the second embodiment, and redundant descriptions of common features of the second and fourth embodiments are omitted unless otherwise required.

Figure 23:
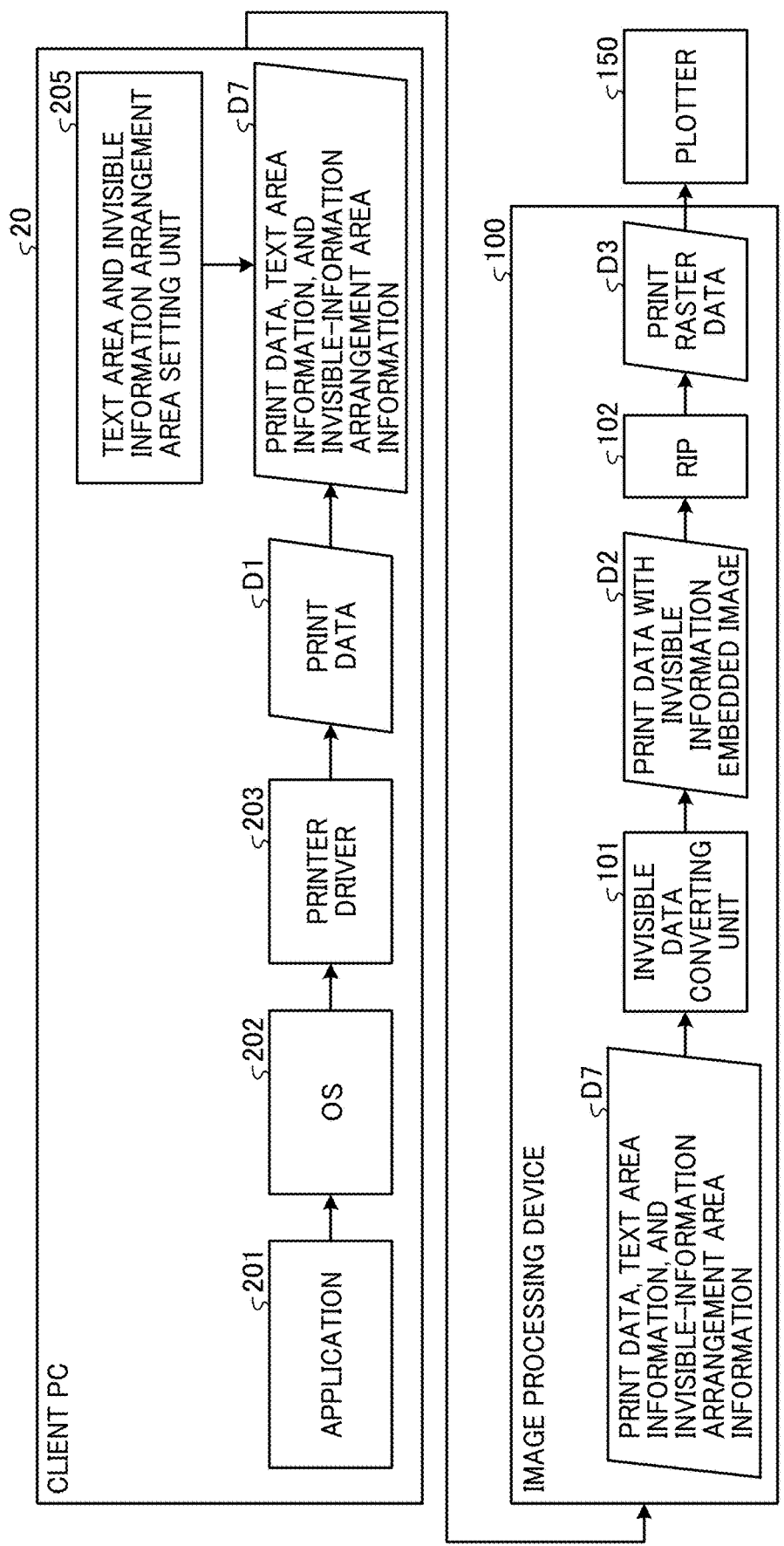
FIG. 23 is a functional block diagram of a client PC and an image processing device according to a fourth embodiment.

FIG. 23 is a functional block diagram of the client PC 20 and the image processing device 100 according to the fourth embodiment.

In the configuration of FIG. 23, the client PC 20 includes a text area and invisible information arrangement area setting unit 205, instead of the text extraction rule R1 of the image processing device 100 described above with reference to the functional block diagram of FIG. 5.

In the client PC 20, the text area and invisible information arrangement area setting unit 205 interprets the print data D1 generated by the printer driver 203 and draws a print image as a print preview screen on the display of the client PC 20. The text area and invisible information arrangement area setting unit 205 receives a text area (i.e., an area of text data to be converted into invisible information) and an arrangement area (i.e., an area in which an invisible information embedded image is to be arranged) input by a user on the print preview screen. The text area and invisible information arrangement area setting unit 205 then transmits, to the image processing device 100, print information D7 including text area information indicating the received text area, invisible-information arrangement area information indicating the received arrangement area, and the print data D1. In the following description the invisible-information arrangement area information may be simply referred to as arrangement area information.

Note that the text area and invisible information arrangement area setting unit 205 may receive a designation of a plurality of text areas in the print data D1. In addition, the text area and invisible information arrangement area setting unit 205 may receive a plurality of invisible information arrangement areas corresponding to the number of designated text areas.

On the other hand, in the image processing device 100, in response to the print information D7 including the print data D1, the text area information, and the arrangement area information, the invisible data converting unit 101 extracts text data of the designated area from the print data D1 according to the text area information included in the print information D7. The invisible data converting unit 101 then converts the extracted text data into an invisible information embedded image and arranges the invisible information embedded image in the arrangement area (e.g., coordinate information) specified in the invisible-information arrangement area information of the print information D7. The arranged print data (i.e., print data with invisible information embedded image D2) is output to the RIP 102, which processes the print data into the print raster data D3 as in the embodiments described above. The plotter 150 is instructed to print the print raster data D3.

Figure 24:
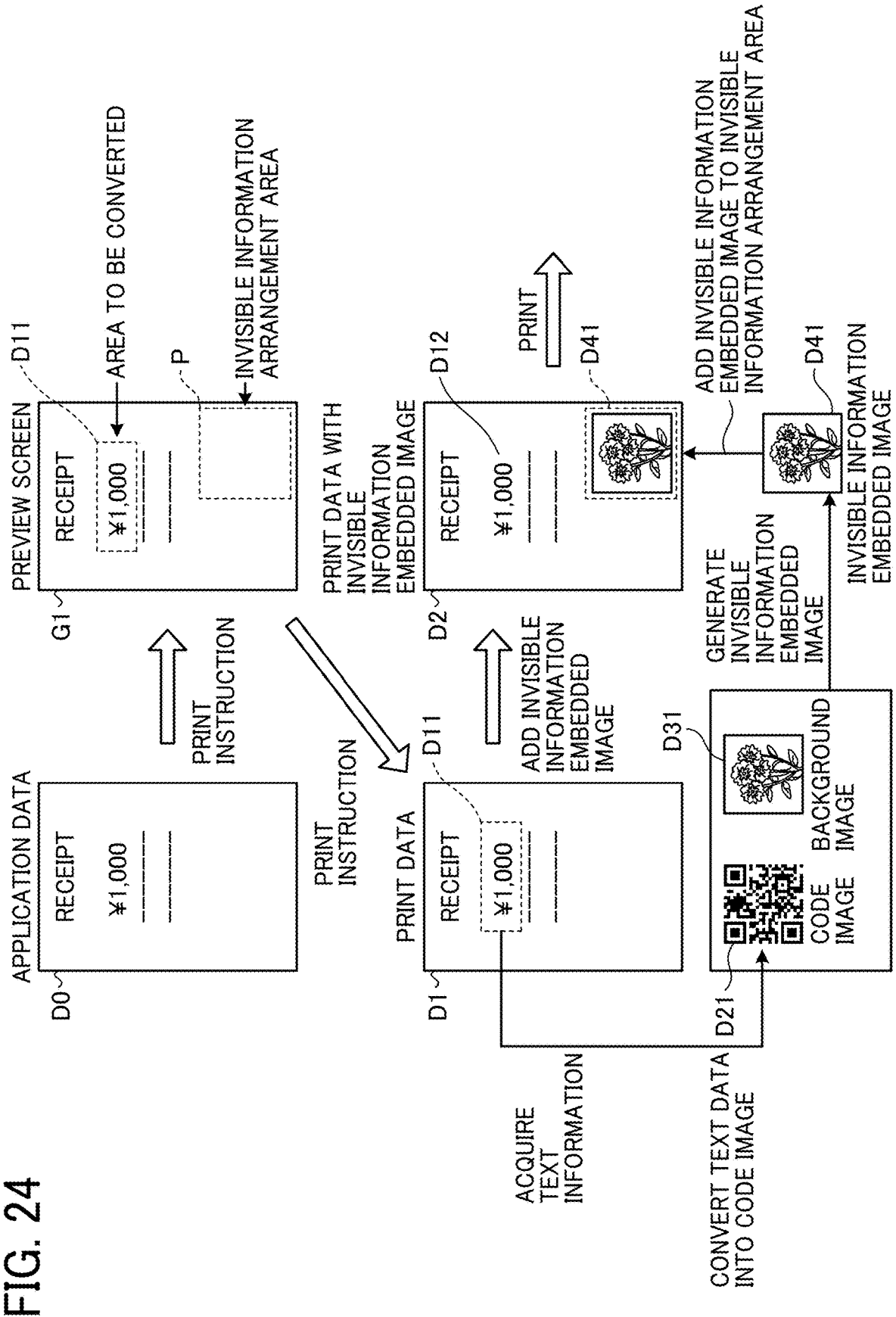
FIG. 24 is a diagram illustrating how to embed invisible information in a document according to the fourth embodiment.

FIG. 24 is a diagram illustrating how to embed invisible information in a document according to the fourth embodiment.

As illustrated in FIG. 24, in response to a print instruction for the document data D0 generated by an application to be printed, the image processing device 100 embeds invisible information as below and instructs the plotter 150 to print.

In the example illustrated in FIG. 24, the text area and invisible information arrangement area setting unit 205 receives, through the preview screen G1, setting or designation of a text area (i.e., an area of text data to be converted into invisible information) and an area in which an invisible information embedded image is to be arranged. In the present example, when a user designates a range of the text information D11 of an amount of money ¥1,000, the text area and invisible information arrangement area setting unit 205 includes the area in the text area information. When the user designates a range (e.g., coordinate information) of an area P in which an invisible information embedded image is to be arranged, the text area and invisible information arrangement area setting unit 205 includes the area P in the invisible-information arrangement area information.

The invisible data converting unit 101 extracts the text information D11 from the text area specified in the text area information. The invisible data converting unit 101 then converts the text data of the text information D11 into the code image D21 and embeds the code image D21 as invisible information in the background image D31. In the example illustrated in FIG. 24, the invisible data converting unit 101 extracts the text information D11 of "¥1,000" and converts "¥1,000" as the text data of the text information D11 into the code image D21.

After embedding the code image D21, the invisible data converting unit 101 arranges the embedded image (i.e., the invisible information embedded image D41) in the area P of the print data D1 specified in the invisible-information arrangement area information. The invisible data converting unit 101 then outputs the print data (i.e., print data with invisible information embedded image D2) in which the invisible information embedded image D41 is arranged and gives instructions for the print data D2 to be printed.

Now, a description is given of a fifth embodiment.

In the embodiments described above, the print data generated by the printer driver 203 is used. Alternatively, an embedding process may be performed on print data generated without a printer driver. For example, a PDF and an Extensible Markup Language (XML) Paper Specification (XPS) format, which are widely used as document browsing file formats, are some types of PDL. Such data formats are also included in the print data compatible with the above-described embedding processes. Such data formats are constructed of a drawing object and coordinate data and are compatible with CMYK colors, thus enabling generation of print data to which the invisible information embedded image described above is added.

Although such PDF and XPS files are available as data for printing, the PDF and XPS files can be generated by a general-purpose application of the client PC 20 or the print server 30 without a printer driver, provided that the PDF and XPS files have a property as a format for storing a document that is stored on the client PC 20 or the print server 30.

Figure 25:
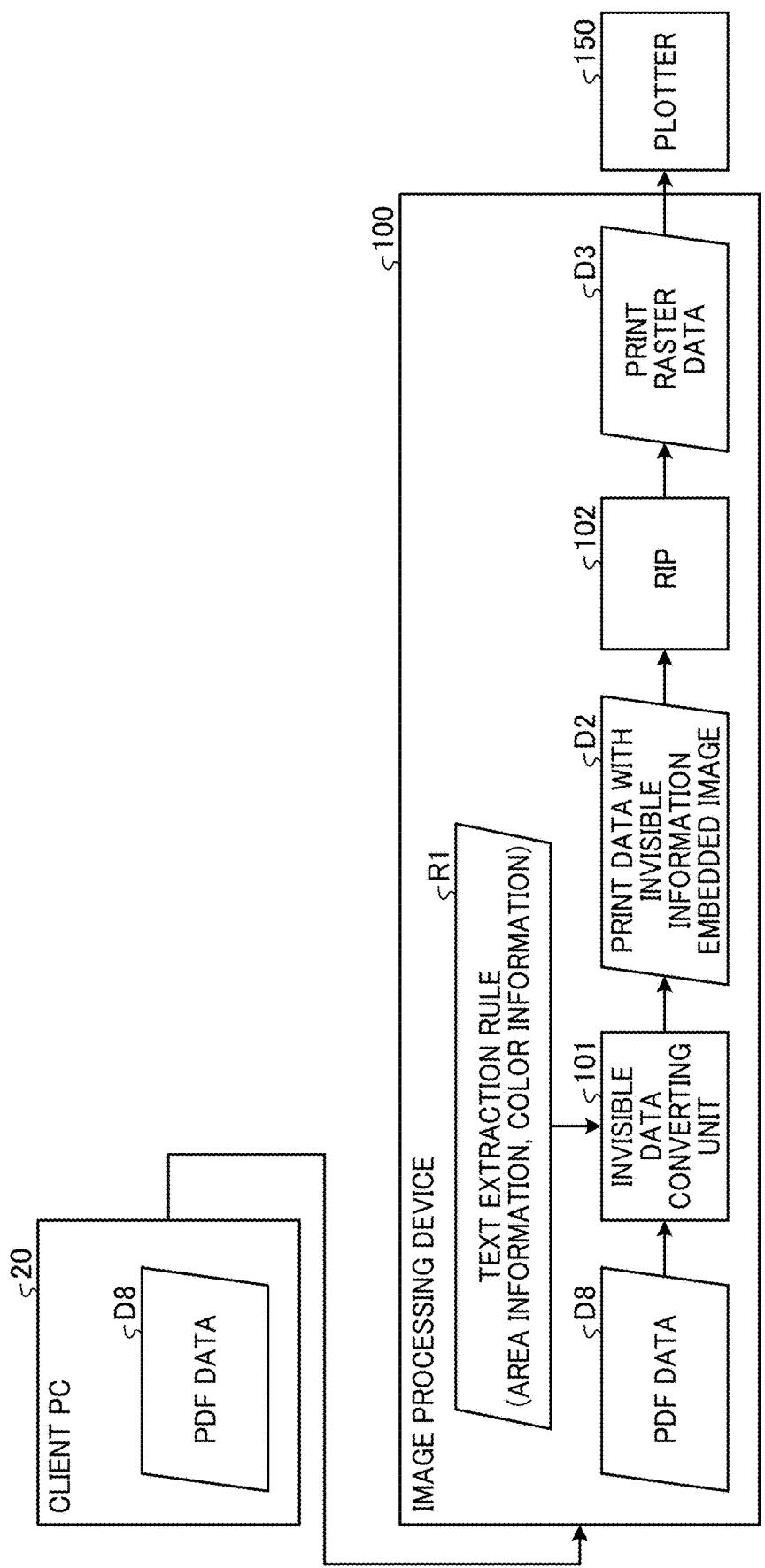
FIG. 25 is a functional block diagram of a client PC and an image processing device according to a fifth embodiment.

FIG. 25 is a functional block diagram of the client PC 20 and the image processing device 100 according to the fifth embodiment.

As illustrated in FIG. 25, since a PDF file D8 or XPS file generated has a property of PDL, the PDF file D8 or the XPS file can be directly transferred to the image processing device 100 without passing through a printer driver and printed. For this reason, the print data can be printed not only in a system that performs printing via a printer driver, but also in a system that converts PDF or XPS data stored on the client PC 20 or the print server 30 into print data with an invisible information embedded image and directly prints the print data with a plotter, without a printer driver.

In the embodiments described above, carbon black is used to render the invisible information latent. Alternatively, for example, a toner that transmits visible light and absorbs infrared light may be used. In other words, a toner which is transparent under visible light but non-transparent under infrared light may be used. In a case in which a toner that is transparent under visible light is used, an infrared mark that is detectable by infrared light alone is printable with the transparent toner superimposed on a white background or an infrared transmissive toner such as cyan, magenta, or yellow toner.

In the embodiments described above, the image processing device is applied to the image forming apparatus. The image processing device may be separate from the plotter 150 or may be a functional unit separate from the plotter 150. Alternatively, the image processing device may be applied to an information processing device such as the print server 30 or the client PC 20. In such an information processing device, for example, a CPU operates according to an installed program, thereby performing part or equivalent functions of the image processing device 100 to generate print data including invisible information.

In the examples illustrated in FIGS. 5, 21, 23, and 25, the processing units are distributed between the processing performed by the information processing device (e.g., the client PC 20 or the print server 30) and the processing performed by the image processing device 100. Alternatively, all the processing units may be implemented by a single information processing device or a single image processing device.

In a comparative example, a particular image prepared in advance is embedded into print data generated by a printer driver.

According to the embodiments of this disclosure, information corresponding to data generated by an application is added to the data for printing. In other words, the data generated by an application is converted into information corresponding to the data generated by the application.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An image processing device comprising:
an inputter to input data; and
circuitry configured to:
search and extract text information to be printed from the input data according to an extraction condition;
convert the text information to be printed into raster image data; and
convert a part of an image of text of the raster image data into invisible information to generate converted information; and
output data for image formation including the converted information,
wherein the invisible information is information detectable by an infrared sensing device.

2. The image processing device according to claim 1, wherein the converted information includes invisible information corresponding to the text information.

3. The image processing device according to claim 1, wherein the circuitry is configured to:
convert a part of an image of text of the text information into invisible information to generate the converted information; and
add the converted information to an area from which the text information is deleted in the data.

4. The image processing device according to claim 3, wherein the circuitry is configured to convert an edge portion of the text into invisible information to generate the converted information.

5. The image processing device according to claim 3, wherein the circuitry is configured to convert a part of an entire image area of the text into invisible information to generate the converted information.

6. The image processing device according to claim 5, wherein the circuitry is configured to convert partially an inside area of an edge portion of the text to include micro texts at given intervals as invisible information.

7. The image processing device according to claim 1, wherein the circuitry is configured to:
convert the text information to be printed into one of a one-dimensional code image and a two-dimensional code image;
acquire a background image; and
set the code image as invisible information to the background image that is visible information acquired, to generate the converted information.

8. The image processing device according to claim 7, wherein the circuitry is configured to acquire the background image from the data.

9. The image processing device according to claim 1, wherein the circuitry is configured to extract, as the text information to be printed, text information in an area corresponding to area information set as an extraction condition, from the data.

10. The image processing device according to claim 1, wherein the circuitry is configured to extract, as the text information to be printed, text information corresponding to color information set as an extraction condition, from the data.

11. The image processing device according to claim 1, wherein the data is print data output by a printer driver.

12. The image processing device according to claim 1, wherein the data is one of portable document format (PDF) data and Extensible Markup Language (XML) Paper Specification (XPS) data.

13. The image processing device according to claim 1, wherein the converted information includes invisible information corresponding to the text information, and
wherein the converted information indicates visible information of the text information together with the invisible information under visible light and indicates the invisible information under invisible light.

14. The image processing device according to claim 1, wherein the converted information includes invisible information corresponding to the text information, and
wherein the invisible information is concealed by a background image and a combination of printing amounts of colorants.

15. An image processing system comprising:
an information processor including:
  circuitry configured to receive an extraction condition set on a screen displaying a print preview of data; and
  an outputter to output the data and the extraction condition received; and
an image processor to give an image forming instruction in response to a print instruction from the information processor,
the image processor including:
  an inputter to input the data and the extraction condition; and
  circuitry configured to:
    search and extract text information to be printed from the data according to the extraction condition;
    convert the text information to be printed into raster image data; and
    convert a part of an image of text of the raster image data into invisible information to generate converted information;
    and
    output data for image formation including the converted information,
wherein the invisible information is information detectable by an infrared sensing device.

16. The image processing system according to claim 15, wherein the circuitry of the information processor is configured to receive setting of one of area information and color information as the extraction condition.

17. A method comprising:
inputting data;
searching and extracting text information to be printed from the data according to the extraction condition;
converting the text information to be printed into raster image data; and
converting a part of an image of text of the raster image data into invisible information to generate converted information;
and
outputting data for image formation including the converted information,
wherein the invisible information is information detectable by an infrared sensing device.

* * * * *